United States Patent
Ogihara et al.

(10) Patent No.: US 9,817,583 B2
(45) Date of Patent: Nov. 14, 2017

(54) STORAGE SYSTEM AND METHOD FOR ALLOCATING VIRTUAL VOLUMES BASED ON ACCESS FREQUENCY

(71) Applicant: FUJITSU LIMITED, Kawasaki-shi, Kanagawa (JP)

(72) Inventors: Kazutaka Ogihara, Hachioji (JP); Kazuichi Oe, Yokohama (JP); Motoyuki Kawaba, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 275 days.

(21) Appl. No.: 14/259,333

(22) Filed: Apr. 23, 2014

(65) Prior Publication Data

US 2014/0359215 A1    Dec. 4, 2014

(30) Foreign Application Priority Data

May 28, 2013   (JP) .................................. 2013-111674

(51) Int. Cl.
*G06F 3/06*   (2006.01)

(52) U.S. Cl.
CPC .......... *G06F 3/0611* (2013.01); *G06F 3/0649* (2013.01); *G06F 3/0665* (2013.01); *G06F 3/0685* (2013.01)

(58) Field of Classification Search
CPC .............................. G06F 3/0611; G06F 3/0685
See application file for complete search history.

(56) References Cited

U.S. PATENT DOCUMENTS

2014/0173035 A1*   6/2014   Kan .................... H04L 67/1095
                                                                    709/217

FOREIGN PATENT DOCUMENTS

JP         7-306757         11/1995
JP        2000-187608        7/2000

OTHER PUBLICATIONS

Guerra, Jorge; Pucha, Himabindu; Glider, Joseph; Belluomini, Wendy; Rangaswami, Raju. 2011. Cost effective storage using extent based dynamic tiering. In Proceedings of the 9th USENIX conference on File and stroage technologies (FAST'11). Usenix Association, Berkeley, CA, USA, 20-20.*

* cited by examiner

*Primary Examiner* — Reginald Bragdon
*Assistant Examiner* — Edward Wang
(74) *Attorney, Agent, or Firm* — Staas & Halsey LLP

(57) ABSTRACT

An information processing device includes a processor. The processor is configured to allocate a plurality of allocation unit areas to a virtual volume from a first storage device and a second storage device. The processor is configured to generate evaluation information related to access for each of a plurality of divided areas into which each of the plurality of allocation unit areas is divided. The processor is configured to determine based on the generated evaluation information, when allocation to the virtual volume is changed from a first allocation unit area of the first storage device to a second allocation unit area of the second storage device, a first data transfer order of transferring data in divided area units from the first allocation unit area to the second allocation unit area. The processor is configured to transfer the data in accordance with the first data transfer order.

10 Claims, 22 Drawing Sheets

FIG. 6

| VIRTUAL VOLUME SUB-LUN | PHYSICAL DISK | | | | | | |
|---|---|---|---|---|---|---|---|
| | DISK ID | SUB-LUN | SUB-BLOCK ID | | | | DATA IN-TRANSFER SUB-BLOCK |
| SUB-LUN#1 | HDD#2 | SL#1 | SB#1 | SB#2 | SB#3 | SB#4 | — |
| SUB-LUN#2 | HDD#2 | SL#2 | SB#1 | SB#2 | SB#3 | SB#4 | — |
| SUB-LUN#3 | HDD#3 | SL#1 | SB#1 | SB#2 | SB#3 | SB#4 | — |
| SUB-LUN#4 | HDD#3 | SL#2 | SB#1 | SB#2 | SB#3 | SB#4 | — |

| VIRTUAL VOLUME SUB-LUN | SUB-BLOCK | | | |
|---|---|---|---|---|
| | SB#1 | SB#2 | SB#3 | SB#4 |
| SUB-LUN#1 | 10 | 30 | 10 | 10 |
| SUB-LUN#2 | 0 | 20 | 0 | 30 |
| SUB-LUN#3 | 10 | 40 | 20 | 10 |
| SUB-LUN#4 | 30 | 0 | 0 | 20 |

| VIRTUAL VOLUME SUB-LUN | PHYSICAL DISK | | | | | | |
|---|---|---|---|---|---|---|---|
| | DISK ID | SUB-LUN | SUB-BLOCK ID | | | | DATA IN-TRANSFER SUB-BLOCK |
| SUB-LUN#1 | SSD#1 | SL#1 | – | SB#2 | – | – | – |
| SUB-LUN#1 | HDD#2 | SL#1 | SB#1 | – | SB#3 | SB#4 | SB#3 |
| SUB-LUN#2 | HDD#2 | SL#2 | SB#1 | SB#2 | SB#3 | SB#4 | – |
| SUB-LUN#3 | HDD#3 | SL#1 | SB#1 | SB#2 | SB#3 | SB#4 | – |
| SUB-LUN#4 | HDD#3 | SL#2 | SB#1 | SB#2 | SB#3 | SB#4 | – |

STORAGE SYSTEM AND METHOD FOR ALLOCATING VIRTUAL VOLUMES BASED ON ACCESS FREQUENCY

CROSS-REFERENCE TO RELATED APPLICATION

This application is based upon and claims the benefit of priority of the prior Japanese Patent Application No. 2013-111674, filed on May 28, 2013, the entire contents of which are incorporated herein by reference.

FIELD

The embodiments discussed herein are related to a storage system and a method for controlling a storage system.

BACKGROUND

Data that is stored in a storage system includes pieces of data having high access frequency, pieces of data having low access frequency, pieces of data that are rarely accessed, and the like. Storage devices that are incorporated into a storage system may be a combination of storage devices with relatively high access performance such as solid state drives (SSDs) and storage devices with relatively low access performance such as hard disk drives (HDDs).

In general, the storage devices with high access performance have a higher cost per data storage capacity than the storage devices with low access performance. The storage system may improve overall access performance at low cost while having a large capacity without using high-performance storage devices for all storage devices included therein, by determining a storage device to serve as a storage destination based on data characteristics, such as access frequency.

Allocation of data to a storage device to serve as a storage destination depending on data characteristics, such as that described above, is known as a hierarchical control method in the storage system. A hierarchical control method is also known that monitors changes in data characteristics and changes the storage device to serve as the storage destination depending on the changes in data characteristics.

Related techniques are disclosed in, for example, Japanese Laid-open Patent Publication No. 2000-187608 and Japanese Laid-open Patent Publication No. 7-306757.

A technique is known in which a virtual volume is configured by receiving allocation of storage area in SUB-logical unit number (LUN) units from the storage device. In this instance, the storage system is capable of performing hierarchical control in which the storage device to serve as the storage destination is changed in SUB-LUN units.

As a result, even when evaluation of data characteristics per volume unit is difficult, the storage system may evaluate the data characteristics in the smaller SUB-LUN units, and allocate storage areas to the storage device in SUB-LUN units.

However, even when allocation is performed in SUB-LUN units to the storage device, changes to the allocation of storage area may be desired to be performed during a time period in which user access load is light, to suppress effect on user access. Therefore, the changes to the allocation of storage area are not able to track load fluctuations on volumes in a manner close to real-time. The effects of hierarchical control may not be sufficiently realized.

SUMMARY

According to an aspect of the present invention, provided is a storage system including a first storage device, a second storage device, and an information processing device. The second storage device has an access speed higher than an access speed of the first storage device. The information processing device allocates storage capacity to a virtual volume from the first storage device and the second storage device. The information processing device includes a processor. The processor is configured to allocate, to the virtual volume, a plurality of allocation unit areas from the first storage device and the second storage device. The processor is configured to generate evaluation information related to access for each of a plurality of divided areas into which each of the plurality of allocation unit areas is divided. The processor is configured to determine based on the generated evaluation information, when allocation to the virtual volume is changed from a first allocation unit area of the first storage device to a second allocation unit area of the second storage device, a first data transfer order of transferring data in divided area units from the first allocation unit area to the second allocation unit area. The processor is configured to transfer the data in accordance with the first data transfer order.

The objects and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 is a diagram illustrating an example of a conversion table according to the second embodiment;

FIG. 7 is a diagram illustrating an example of a sub-block evaluation table according to the second embodiment;

FIG. 14 is a diagram illustrating an example of a conversion table according to the second embodiment;

DESCRIPTION OF EMBODIMENTS

Hereinafter, embodiments will be described in detail with reference to the drawings.

First Embodiment

Figure 1:
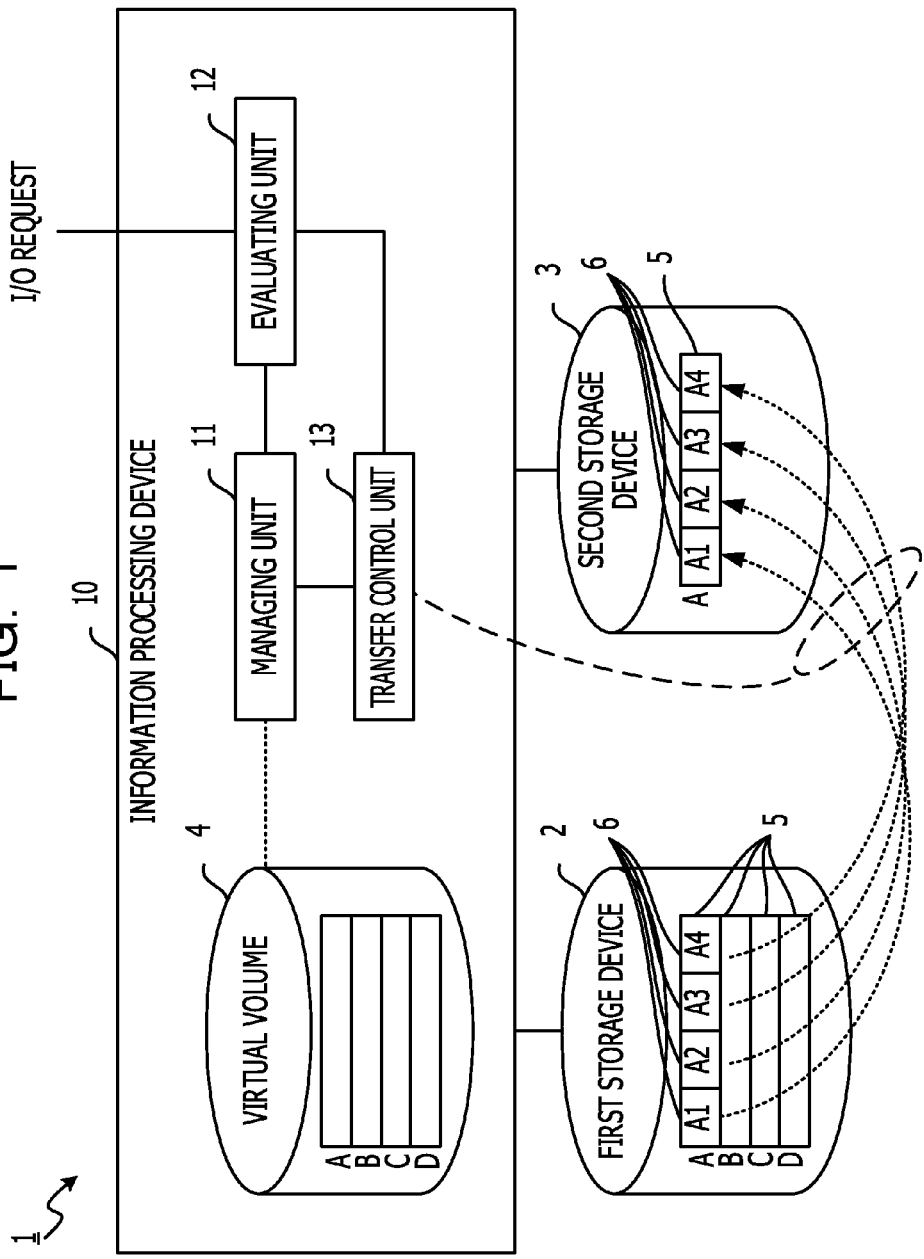
FIG. 1 is a diagram illustrating an exemplary configuration of a storage system according to a first embodiment.

A storage system according to a first embodiment will be described with reference to FIG. 1. FIG. 1 is a diagram illustrating an exemplary configuration of a storage system according to the first embodiment.

A storage system 1 includes a first storage device 2, a second storage device 3, and an information processing device 10. The first storage device 2 and the second storage device 3 are each one or a plurality of storage devices capable of storing data therein. The storage device is, for example, a HDD or an SSD such as a flash memory drive.

The first storage device 2 has a slower access speed than the second storage device 3. In addition, the first storage device 2 has a larger capacity and lower cost per capacity than the second storage device 3. The second storage device 3 has a faster access speed than the first storage device 2. In addition, the second storage device 3 has a smaller capacity and higher cost per capacity than the first storage device 2. For example, if the first storage device 2 is an HDD, the second storage device 3 is an SSD. For example, if the first storage device 2 is a nearline disk, the second storage device 3 is an online disk. In this instance, both the first storage device 2 and the second storage device 3 may be HDDs that differ in performance or SSDs that differ in performance.

The information processing device 10 manages a virtual volume 4 and receives an I/O request (access) from a user.

The first storage device 2 and the second storage device 3 each have a plurality of allocation unit areas 5 that serve as allocation units of storage capacity allocated to the virtual volume 4. The allocation unit area 5 is, for example, referred to as a SUB-LUN. One or more allocation unit areas 5 are allocated to the virtual volume 4. The allocation unit areas 5 belonging to different storage devices (first storage device 2 and second storage device 3) may be allocated to the virtual volume 4. For example, the virtual volume 4 receives allocation of four allocation unit areas 5 ("A", "B", "C", and "D") from the first storage device 2.

The information processing device 10 includes a managing unit 11, an evaluating unit 12, and a transfer control unit 13. The managing unit 11 allocates the allocation unit area 5 to the virtual volume 4. The managing unit 11 manages a correlation with the allocation origin (first storage device 2 or second storage device 3) for each of the plurality of allocation unit areas 5 allocated to the virtual volume 4.

As a result, for example, when the access frequencies of all allocation unit areas 5 allocated to the virtual volume 4 are low, the information processing device 10 may allocate all allocation unit areas 5 to the virtual volume 4 from the first storage device 2. For example, when the access frequencies of all allocation unit areas 5 allocated to the virtual volume 4 are high, the information processing device 10 may allocate all allocation unit areas 5 to the virtual volume 4 from the second storage device 3. Furthermore, for example, the information processing device 10 may configure the allocation unit areas 5 to be allocated to the virtual volume 4 from the first storage device 2 and the second storage device 3 depending on the changes in access frequencies of all allocation unit areas 5 allocated to the virtual volume 4. Moreover, the information processing device 10 may change the configuration ratio of the first storage device 2 and the second storage device 3.

For example, when the access frequency of an allocation unit area 5 ("A") increases, the information processing device 10 may change the allocation origin of the allocation unit area 5 ("A") to the virtual volume 4 from the first storage device 2 to the second storage device 3.

The allocation unit area 5 has a not small size (such as 1 GB), while being smaller than the virtual volume 4 (such as 4 GB). Therefore, the information processing device 10 takes time to change the allocation origin of the allocation unit area 5 of the virtual volume 4. Therefore, the information processing device 10 divides the allocation unit area 5 into smaller (such as 256 MB) divided areas 6. For example, the allocation unit area 5 ("A") is divided into divided areas 6 ("A1", "A2", "A3", and "A4").

The evaluating unit 12 generates evaluation information for an I/O request (access) from the user for each divided area 6 that is smaller than the allocation unit area 5. For example, the evaluating unit 12 generates evaluation information on an evaluation of the most recent access frequency from the user for each divided area 6. As an evaluation index for generating the evaluation information, an arbitrary index may be used, such as input output per second (IOPS) or throughput, instead of access frequency.

When allocation to the virtual volume 4 is changed from the allocation unit area 5 (first allocation unit area) of the first storage device 2 to the allocation unit area 5 (second allocation unit area) of the second storage device 3, the transfer control unit 13 controls transfer of data based on the evaluation information. First, the transfer control unit 13 determines a data transfer order for transferring pieces of data in divided area 6 units from the first allocation unit area to the second allocation unit area based on the evaluation information. The transfer control unit 13 transfers the pieces of data in accordance with the determined data transfer order.

For example, when the allocation unit area 5 ("A") of the first storage device 2 allocated to the virtual volume 4 is changed to the allocation unit area 5 ("A") of the second storage device 3, the transfer control unit 13 moves the pieces of data in divided area 6 units. When the evaluation by the evaluating unit 12 indicated in the evaluation information is the order of "A1", "A2", "A3", to "A4" in the divided areas 6, the transfer control unit 13 transfers the pieces of data in the order of "A1", "A2", "A3", and "A4".

In general, because the allocation unit area 5 has a not small size, an area having high access frequency and an area having low access frequency are mixed in the allocation unit area 5. The divided areas 6 contribute to allowing such localized imbalances in access frequency to be evaluated per subsection. The transfer control unit 13 transfers the pieces of data in divided area 6 units depending on the imbalance in access frequency, and therefore may transfer the data to the second storage device 3 more quickly for areas with higher access frequency. In other words, the user may receive the benefits of the transfer of data to the second storage device 3 without delay. The storage system 1 may efficiently improve access performance in relation to load fluctuations.

Second Embodiment

Figure 2:
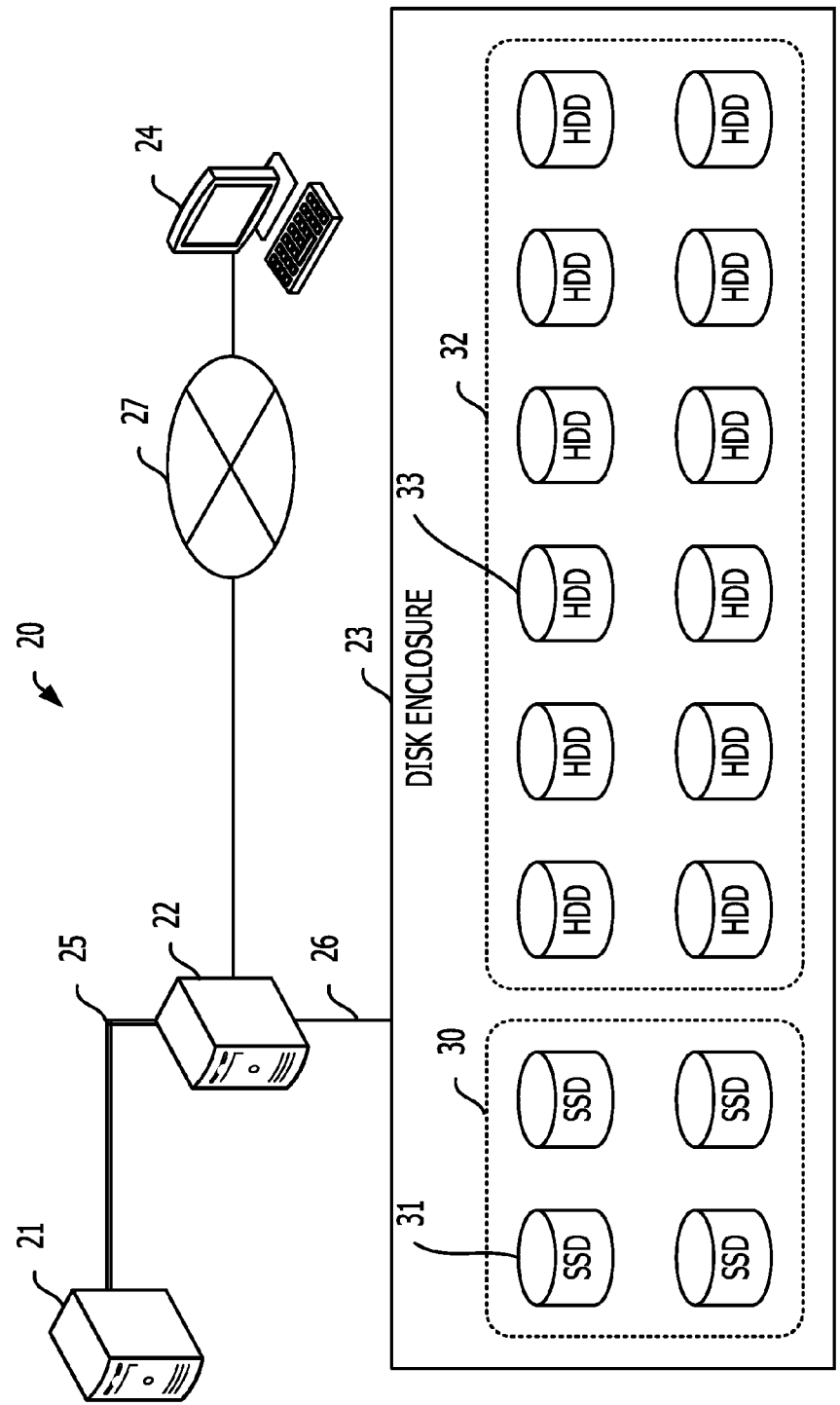
FIG. 2 is a diagram illustrating an exemplary configuration of a storage system according to a second embodiment.

Next, a configuration of a storage system according to a second embodiment will be described with reference to FIG. 2. FIG. 2 is a diagram illustrating an exemplary configuration of the storage system according to the second embodiment.

A storage system 20 includes a data transfer instructing server 21, a data storage server 22, and a disk enclosure 23. The data transfer instructing server 21 and the data storage server 22 are communicably connected with each other by a communication path 25. The data storage server 22 and the disk enclosure 23 are communicably connected with each other by a communication path 26. The data storage server 22 is communicably connected with a client 24 by a network 27.

The disk enclosure 23 houses high speed devices 31 and low speed devices 33 as storage resources. Each high speed device 31 is an SSD of high access speed. The high speed devices 31 configure a high speed device group 30. Each low speed device 33 is an HDD of low access speed. The low speed devices 33 configure a low speed device group 32. High access speed and low access speed prescribe relative access speeds based on comparison between the high speed device 31 and the low speed device 33 that are storage resources provided in the storage system 20.

The data transfer instructing server 21 determines a device (high speed device 31 or low speed device 33) that configures SUB-LUNs (allocation unit areas) that are allocated to a virtual volume in accordance with a predetermined policy. When changing the configuration of the SUB-LUNs allocated to the virtual volume, the data transfer instructing server 21 instructs the data storage server 22 on the change details. For example, when I/O requests to a SUB-LUN that is in the low speed device 33 increases, the data transfer instructing server 21 makes a judgment to transfer data to a SUB-LUN that is in the high speed device 31.

The data storage server 22 receives an I/O request (access request) from the client 24 and responds to the I/O request. In addition, the data storage server 22 changes devices configuring SUB-LUNs allocated to the virtual volume in accordance with the instruction for change to the configuration of the SUB-LUNs received from the data transfer instructing server 21.

Although the data transfer instructing server 21 and the data storage server 22 are provided separately in the present embodiment, they may be provided as an integrated device in which respective functions are integrated.

In the storage system 20 such as that described above, I/O performance of the virtual volume may be maintained at a high standard at low cost, without using the high speed device 31 for all storage resources.

Figure 3:
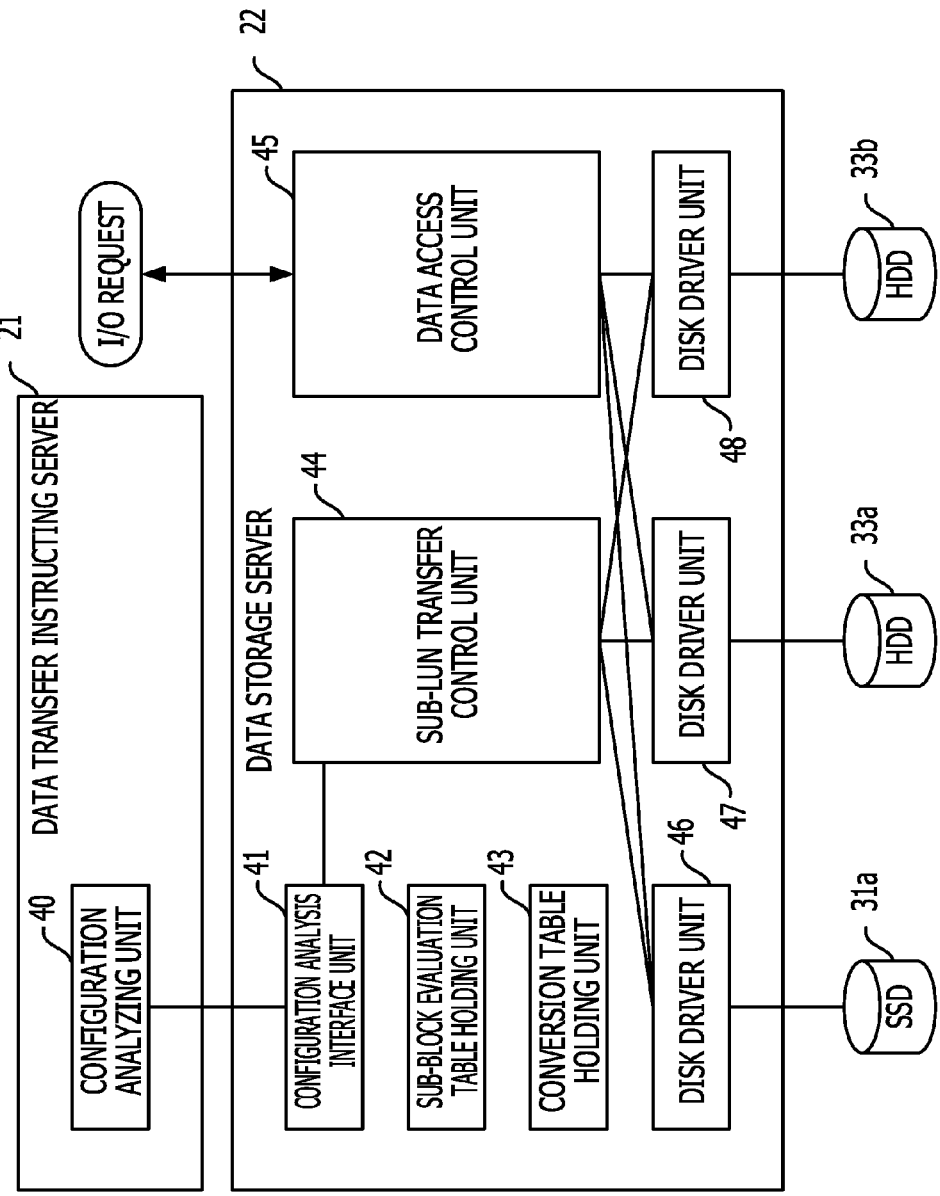
FIG. 3 is a diagram illustrating an exemplary functional configuration of the storage system according to the second embodiment.

Next, a functional configuration of the storage system according to the second embodiment will be described with reference to FIGS. 3 to 9. FIG. 3 is a diagram illustrating an exemplary functional configuration of the storage system according to the second embodiment.

The data transfer instructing server 21 includes a configuration analyzing unit 40. The data storage server 22 includes a configuration analysis interface unit 41, a sub-block evaluation table holding unit 42, a conversion table holding unit 43, a SUB-LUN transfer control unit 44, a data access control unit 45, and disk driver units 46, 47, and 48.

Figure 4:
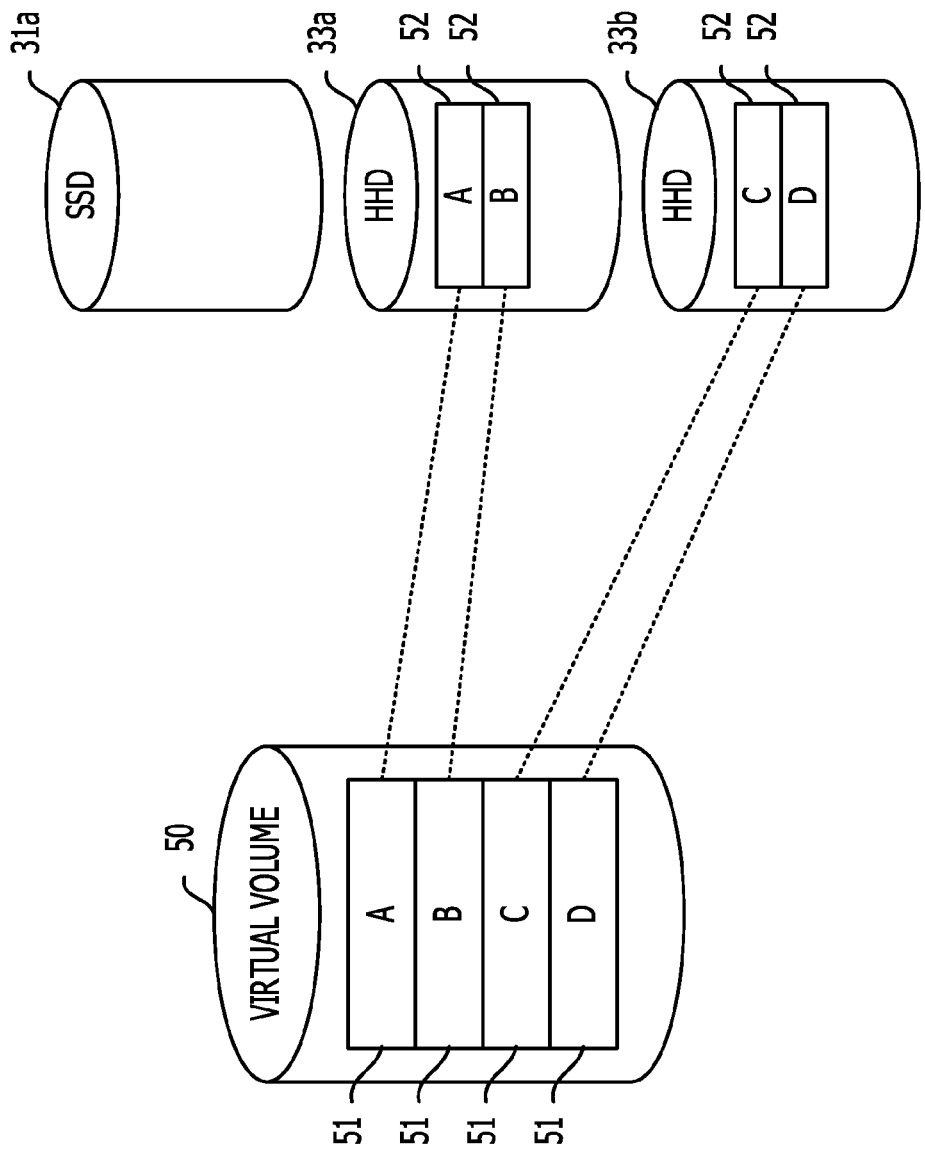
FIG. 4 is a diagram illustrating an example of a relationship between a virtual volume and SUB-LUNs according to the second embodiment.

Before each function is described, the virtual volume and the SUB-LUNs will be described with reference to FIG. 4. FIG. 4 is a diagram illustrating an example of a relationship between a virtual volume and SUB-LUNs according to the second embodiment.

A virtual volume 50 is composed of SUB-LUNs 52 which are physical areas that correspond to SUB-LUNs 51 ("A", "B", "C", and "D") which are virtually divided areas. For example, the virtual volume 50 is configured by a combination of the SUB-LUNs 52 ("A" and "B") of a low speed device 33a and SUB-LUNs 52 ("C" and "D") of a low speed device 33b, and does not include SUB-LUNs 52 of a high speed device 31a. A correlation between the SUB-LUNs 51 of the virtual volume 50 and the SUB-LUNs 52 is maintained by a conversion table, described later.

Figure 5:
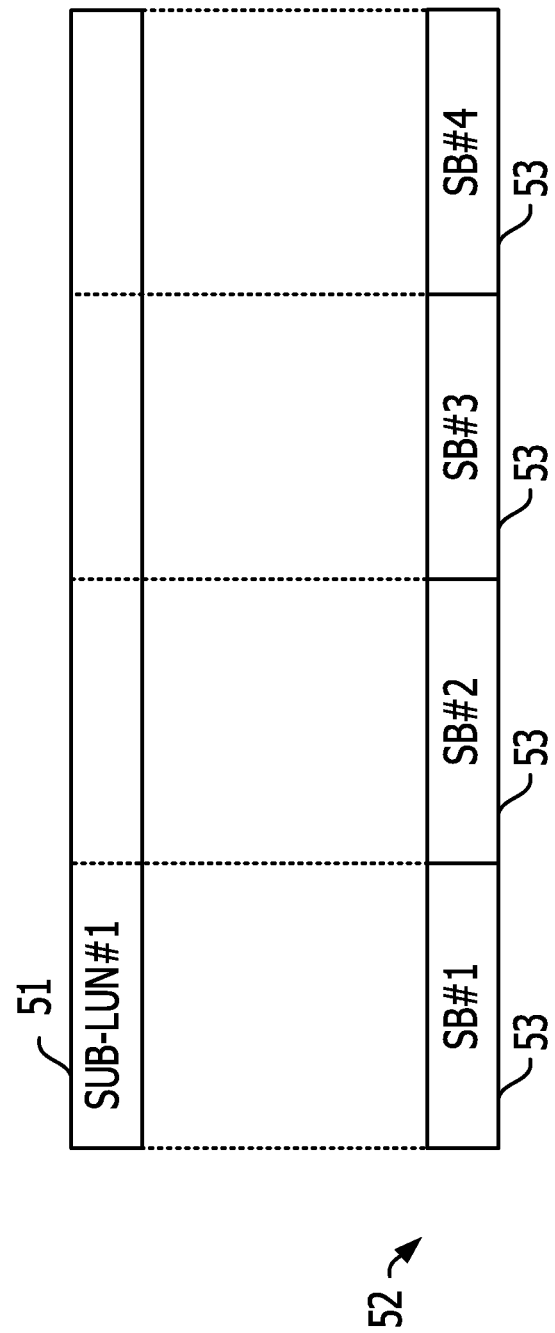
FIG. 5 is a diagram illustrating an example of a relationship between a SUB-LUN and sub-blocks according to the second embodiment.

Next, sub-blocks that serve as data transfer units of the SUB-LUN will be described with reference to FIG. 5. FIG. 5 is a diagram illustrating an example of a relationship between a SUB-LUN and sub-blocks according to the second embodiment.

The SUB-LUN 52 corresponding to the SUB-LUN 51 ("SUB-LUN#1") is configured by a plurality of sub-blocks 53 (divided areas). The sub-blocks 53 are the SUB-LUN 52 divided into data transfer units. The number of divisions is arbitrary and not limited to four as illustrated. For example, the sub-blocks 53 may be the SUB-LUN 52 divided into a predetermined number of sub-blocks that is set in advance. Alternatively, the sub-blocks 53 may be the SUB-LUN 52 divided by a size that is set in advance. The sub-blocks 53 each have identification information ("SB#1", "SB#2", "SB#3", and "SB#4") that allows the correlation therebetween to be identified.

Next, a conversion table that holds the correlation between the SUB-LUNs which are virtual areas and the SUB-LUNs which are physical areas will be described with reference to FIG. 6. FIG. 6 is a diagram illustrating an example of a conversion table according to the second embodiment.

A conversion table 60 holds the correlation between a SUB-LUN 51 and a SUB-LUN 52. The conversion table 60 includes "virtual volume SUB-LUN" and "physical disk" (high speed device 31 or low speed device 33). The virtual volume SUB-LUN is information indicating a SUB-LUN 51 of the virtual volume 50, and includes, for example, "SUB-LUN#1", "SUB-LUN#2", "SUB-LUN#3", and "SUB-LUN#4".

The "physical disk" includes "disk identification (ID)", "SUB-LUN", "sub-block ID", and "data in-transfer sub-block". The disk ID is identification information that allows a device (physical disk) to be identified. SUB-LUN is identification information that allows a SUB-LUN to be identified. The sub-block ID is identification information that allows a sub-block to be identified. The sub-block ID may also include address information for accessing a sub-block 53 in addition to, or instead of, the identification information that allows the sub-block 53 to be identified. The data in-transfer sub-block is information indicating a sub-block is in the midst of data transfer. When no sub-block that is in the midst of data transfer is present, the data in-transfer sub-block is set to "–".

For example, the SUB-LUN 51 of the virtual volume 50 identified by "SUB-LUN#1" corresponds to the SUB-LUN 52 identified by "SL#1" of the device identified by "HDD#2". The SUB-LUN 52 is configured by four sub-blocks 53 ("SB#1", "SB#2", "SB#3", and "SB#4"), and is indicated as having no sub-block 53 that is in the midst of data transfer.

Here, returning to FIG. 3, the configuration analyzing unit 40 performs analysis of the devices configuring the SUB-LUNs 52 to be allocated to the virtual volume 50. The configuration analyzing unit 40 judges whether or not to change the devices that configure the SUB-LUN 52 to be allocated to the virtual volume 50 based on the analysis. When judged that the configuration of the SUB-LUNs 52 to be allocated to the virtual volume 50 is to be changed, the configuration analyzing unit 40 instructs the data storage server 22 to transfer data in SUB-LUN units. The instruction for data transfer of the SUB-LUNs 52 includes information allowing a SUB-LUN 52 of the transfer origin device to be identified and information allowing a SUB-LUN 52 of the transfer destination device to be identified. The configuration analyzing unit 40 acquires configuration information that is used for analysis of the devices configuring the SUB-LUNs 52 from the configuration analysis interface unit 41.

The configuration analysis interface unit 41 receives the data transfer instruction for the SUB-LUNs 52 from the configuration analyzing unit 40. The configuration analysis interface unit 41 gives notification of the received data transfer instruction to the SUB-LUN transfer control unit 44. In addition, the configuration analysis interface unit 41 also gives notification of the configuration information to the configuration analyzing unit 40.

The sub-block evaluation table holding unit 42 holds a sub-block evaluation table in which access states are evaluated in sub-block units. The sub-block evaluation table will be described later with reference to FIG. 7. The conversion table holding unit 43 holds the conversion table 60.

The SUB-LUN transfer control unit 44 receives the data transfer instruction for the SUB-LUNs 52 from the configuration analyzing unit 40, via the configuration analysis interface unit 41. The SUB-LUN transfer control unit 44 transfers (copies) data in the SUB-LUN 52 that is designated as the transfer origin to the SUB-LUN 52 that is designated as the transfer destination. When transferring the data, the SUB-LUN transfer control unit 44 decides the data transfer order for transferring the pieces of data in sub-block units and transfers the pieces of data in the data transfer order that has been decided. The SUB-LUN transfer control unit 44 decides the data transfer order based on the sub-block evaluation table. The SUB-LUN transfer control unit 44 accesses the devices (high speed device 31a, and low speed devices 33a and 33b) via the disk driver units 46, 47, and 48, respectively.

The data access control unit 45 receives the I/O requests. The data access control unit 45 references the conversion table 60 and issues the I/O requests to the devices (high speed device 31a, and low speed devices 33a and 33b) via the disk driver units 46, 47, and 48, respectively. At this time, the data access control unit 45 evaluates access states of the sub-blocks and updates the sub-block evaluation table.

Next, the sub-block evaluation table will be described with reference to FIG. 7. FIG. 7 is a diagram illustrating an example of a sub-block evaluation table according to the second embodiment.

A sub-block evaluation table 62 holds the correlation between a SUB-LUN 51 and the evaluation of the access state of each sub-block 53. The sub-block evaluation table 62 includes "virtual volume SUB-LUN" and an evaluation value of the access state of each sub-block 53. The virtual volume SUB-LUN is information indicating a SUB-LUN 51 of the virtual volume 50, and includes, for example, "SUB-LUN#1", "SUB-LUN#2", "SUB-LUN#3", and "SUB-LUN#4". The evaluation value of the access state of each sub-block 53 is, for example, the number (access frequency) of accesses within a predetermined amount of time.

For example, the SUB-LUN 51 of the virtual volume 50 identified by "SUB-LUN#1" is configured by four sub-blocks 53 ("SB#1", "SB#2", "SB#3", and "SB#4"). The evaluation value of "SB#1" in "SUB-LUN#1" is "10". Similarly, the evaluation value of "SB#2" is "30", the evaluation value of "SB#3" is "10", and the evaluation value of "SB#4" is "10".

Two sub-block evaluation tables 62 are provided. When one sub-block evaluation table 62 is an update sub-block evaluation table, the other is a reference sub-block evaluation table. The evaluation values in the update sub-block evaluation table are updated to accumulate the number of accesses within a predetermined amount of time. After the elapse of the predetermined amount of time, the update sub-block evaluation table becomes the reference sub-block evaluation table and the evaluation values therein are fixed for the predetermined amount of time. After the elapse of the predetermined amount of time again, the reference sub-block evaluation table becomes the update sub-block evaluation table and the evaluation values therein are reset. Therefore, the two sub-block evaluation tables 62 are each switched between the update sub-block evaluation table and the reference sub-block evaluation table every predetermined amount of time.

Figure 8:
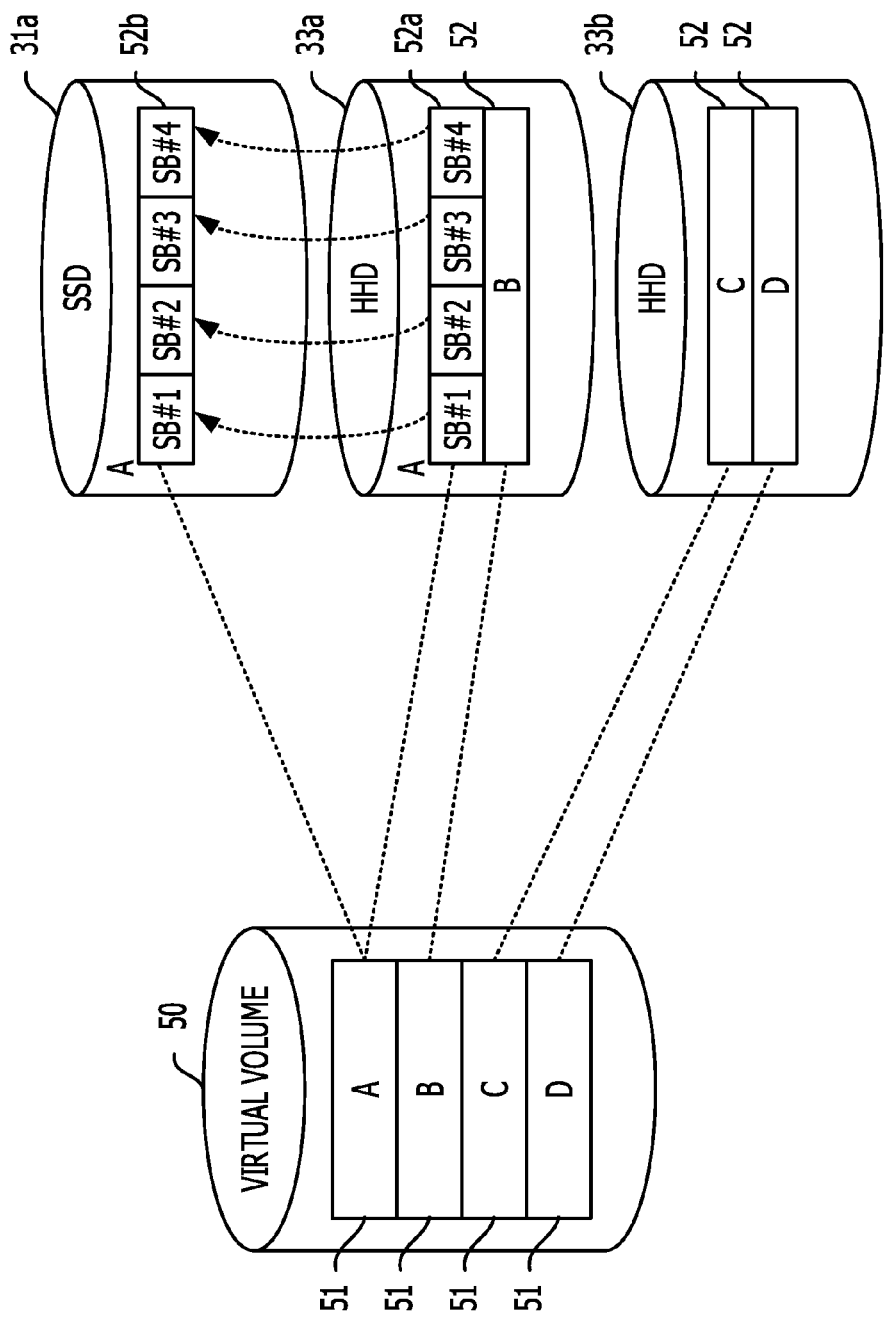
FIG. 8 is a diagram illustrating an example of a relationship between a virtual volume and a SUB-LUN that is in the midst of data transfer according to the second embodiment.

Next, the data transfer in sub-block units will be described with reference to FIG. 8. FIG. 8 is a diagram illustrating an example of a relationship between a virtual volume and a SUB-LUN that is in the midst of data transfer according to the second embodiment.

For example, the SUB-LUN transfer control unit 44 receives an instruction from the configuration analyzing unit 40 via the configuration analysis interface unit 41 to perform data transfer from the SUB-LUN 52a of the low speed device 33a to the SUB-LUN 52b of the high speed device 31a.

The SUB-LUN transfer control unit 44 references the sub-block evaluation table 62 and decides, for example, the data transfer order of the pieces of data to be "SB#2", "SB#3", "SB#4" and "SB#1" based on the evaluation values of the sub-blocks 53 corresponding to the SUB-LUN 51 ("A"). In this instance, the SUB-LUN transfer control unit 44 performs data transfer from SUB-LUN 52a to SUB-LUN 52b in sub-block units in the order of "SB#2", "SB#3", "SB#4", and "SB#1".

As a result, the storage system 20 is able to receive, without delay, the benefits of transferring data from the SUB-LUN 52a to the SUB-LUN 52b by prioritizing data transfer of the sub-block 53 that has a high access state evaluation value. The storage system 20 may efficiently improve access performance in relation to load fluctuations.

Figure 9:
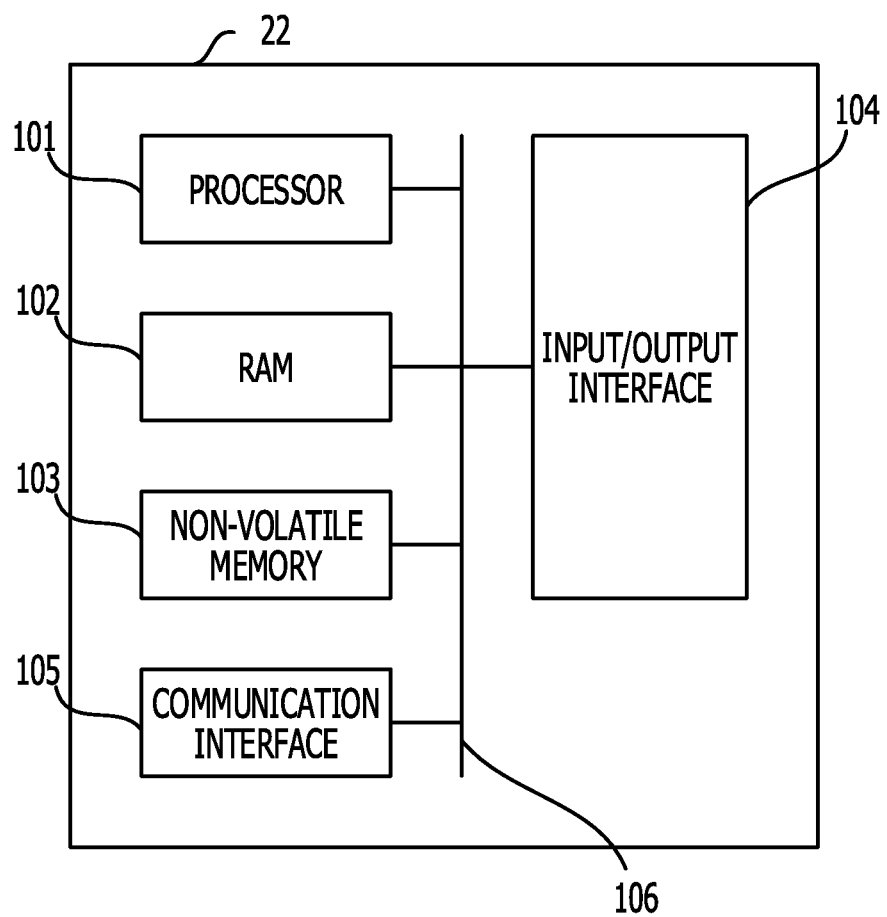
FIG. 9 is a diagram illustrating an exemplary hardware configuration of a data storage server according to the second embodiment.

Next, a hardware configuration of the data storage server according to the second embodiment will be described with reference to FIG. 9. FIG. 9 is a diagram illustrating an exemplary hardware configuration of the data storage server according to the second embodiment.

The overall data storage server 22 is controlled by a processor 101. The processor 101 is connected to a random access memory (RAM) 102 and a plurality of peripheral devices by a bus 106. The processor 101 may be a multi-processor. The processor 101 is, for example, a central processing unit (CPU), a micro processing unit (MPU), a digital signal processor (DSP), an application specific integrated circuit (ASIC), or a programmable logic device (PLD). The processor 101 may also be a combination of two or more elements among the CPU, MPU, DSP, ASIC, and PLD.

The RAM 102 is used as a main storage device of the data storage server 22. The RAM 102 temporarily stores therein at least some of operating system (OS) programs, firmware, and application programs executed by the processor 101. In addition, the RAM 102 stores therein various pieces of data for processes (such as information management for system control) performed by the processor 101. The RAM 102 may include a cache memory separately from the memory in which the various pieces of data are stored.

The peripheral devices connected to the bus 106 include a non-volatile memory 103, an input/output interface 104, and a communication interface 105.

The non-volatile memory 103 retains stored content even when power to the data storage server 22 is cut off. The non-volatile memory 103 is, for example, a semiconductor storage device such as an electrically erasable and programmable read only memory (EEPROM) or a flash memory, or an HDD. The non-volatile memory 103 is used as an auxiliary storage device of the data storage server 22. The non-volatile memory 103 stores therein operating system programs, firmware, application programs, and various pieces of data.

The input/output interface 104 is connected to an input/output device (not illustrated) and performs input and output.

The communication interface 105 connects with a network that forms the communication paths 25 and 26, thereby transmitting and receiving data to and from the data transfer instructing server 21 and the disk enclosure 23 over the communication paths 25 and 26. The communication interface 105 also transmits and receives data to and from the client 24 by connecting to the network 27.

In the hardware configuration such as that described above, processing functions of the data storage server 22 according to the second embodiment may be actualized. In addition to the data storage server 22, the data transfer instructing server 21 and the information processing device 10 according to the first embodiment may also be actualized by hardware similar to that of the data storage server 22 illustrated in FIG. 9.

For example, the data storage server 22 executes programs recorded on a computer-readable recording medium and actualizes the processing functions according to the second embodiment. The programs in which processing details to be executed by the data storage server 22 are written may be recorded in various types of recording media. For example, the programs to be executed by the data storage server 22 may be stored in the non-volatile memory 103. The processor 101 loads at least some of the programs in the non-volatile memory 103 to the RAM 102 and executes the program. The programs to be executed by the data storage server 22 may be recorded in a portable recording medium, such as an optical disk, a memory device, or a memory card (not illustrated). Optical disks include digital versatile disk (DVD), DVD-RAM, compact disc read-only memory (CD-ROM), CD-recordable (CD-R)/-rewritable (RW). The memory device includes a communication function for communicating with the input/output interface 104 or a device connection interface (not illustrated) in addition to a recording medium. For example, the memory device may be capable of writing data onto a memory card by a memory reader/writer, or may be capable of reading out data from the memory card. The memory card is a card-shaped recording medium.

The program stored in the portable recording medium is able to be executed after the program is installed in the non-volatile memory 103 under the control of the processor 101, for example. The processor 101 may also read out the program directly from the portable recording medium and execute the program.

Figure 10:
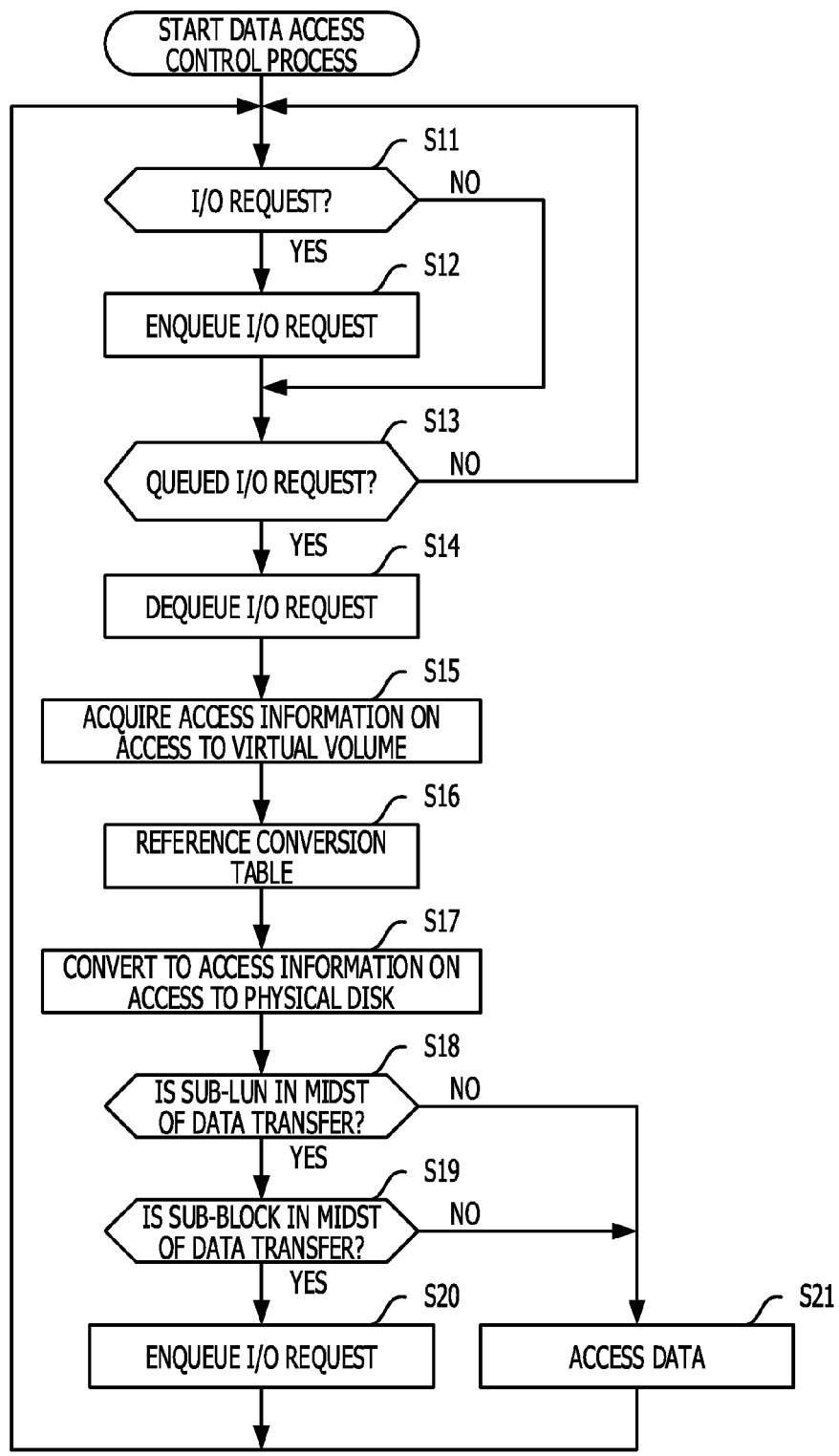
FIG. 10 is a flowchart of a data access control process according to the second embodiment.

Next, a data access control process according to the second embodiment will be described with reference to FIG. 10. FIG. 10 is a flowchart of the data access control process according to the second embodiment.

In the data access control process, an I/O request is received and data access to a device (high speed device 31 or low speed device 33) is performed. The data access control process is performed by the data access control unit 45 with the startup of the data storage server 22 as a trigger.

(S11) The data access control unit 45 judges whether or not an I/O request is received. When judged that an I/O request is received, the data access control unit 45 proceeds to S12. When judged that an I/O request is not received, the data access control unit 45 proceeds to S13.

(S12) The data access control unit 45 enqueues the received I/O request in an I/O wait queue.

(S13) The data access control unit 45 judges whether or not an I/O request is present in the I/O wait queue. When judged that an I/O request is present in the I/O wait queue, the data access control unit 45 proceeds to S14. When judged that an I/O request is not present in the I/O wait queue, the data access control unit 45 proceeds to S11.

(S14) The data access control unit 45 dequeues an I/O request from the I/O wait queue.

(S15) The data access control unit 45 acquires, from the I/O request, access information (such as access location, size, and data to be written) on access to the virtual volume 50.

(S16) The data access control unit 45 references the conversion table 60.

(S17) The data access control unit 45 converts the access information on access to the virtual volume 50 to access information (access location (disk, SUB-LUN, and sub-block), size, and data to be written) on access to a physical disk (device: high speed device 31 or low speed device 33) based on the conversion table 60.

(S18) The data access control unit 45 judges whether or not the SUB-LUN to be accessed is a SUB-LUN that is in the midst of data transfer. When judged that the SUB-LUN to be accessed is a SUB-LUN that is in the midst of data transfer, the data access control unit 45 proceeds to S19. When judged that the SUB-LUN to be accessed is not a SUB-LUN that is in the midst of data transfer, the data access control unit 45 proceeds to S21.

(S19) The data access control unit 45 judges whether or not the sub-block to be accessed is a sub-block that is in the midst of data transfer. When judged that the sub-block to be accessed is a sub-block that is in the midst of data transfer, the data access control unit 45 proceeds to S20. When judged that the sub-block to be accessed is not a sub-block that is in the midst of data transfer, the data access control unit 45 proceeds to S21.

(S20) The data access control unit 45 enqueues the I/O request to be processed in the I/O wait queue and proceeds to S11.

(S21) The data access control unit 45 performs data access to the physical disk and makes an appropriate response to the request.

Figure 11:
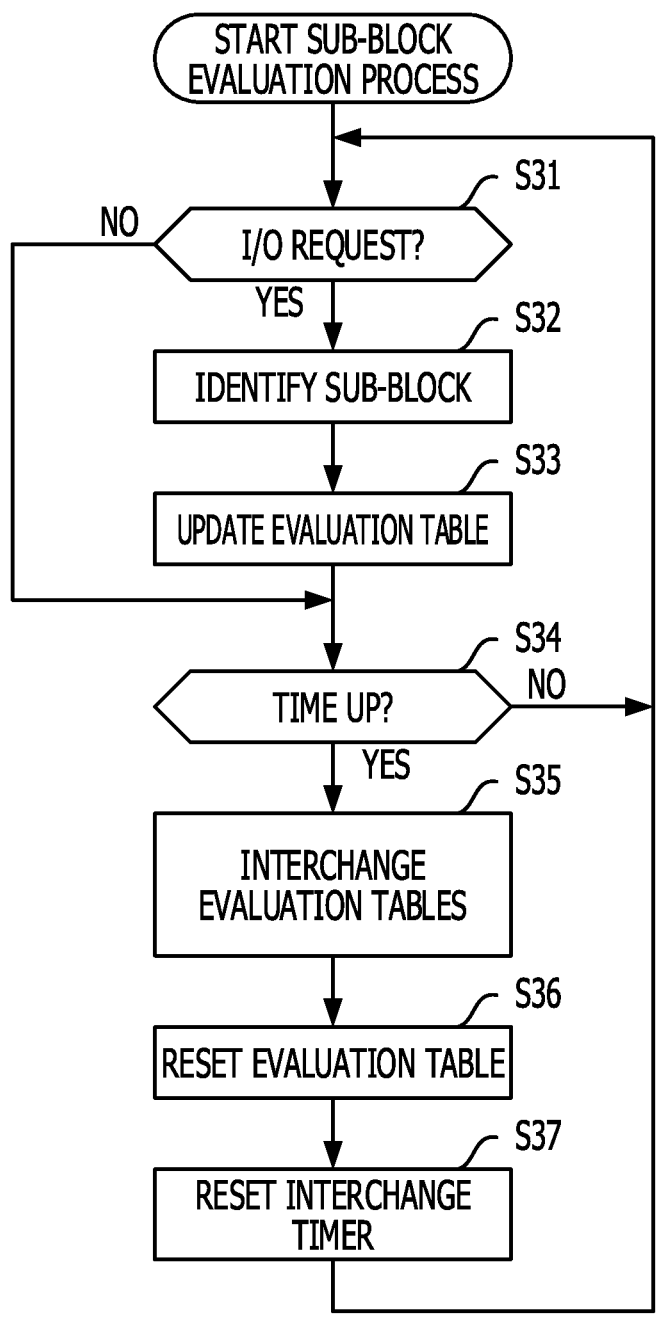
FIG. 11 is a flowchart of a sub-block evaluation process according to the second embodiment.

Next, a sub-block evaluation process according to the second embodiment will be described with reference to FIG. 11. FIG. 11 is a flowchart of the sub-block evaluation process according to the second embodiment.

In the sub-block evaluation process, the update sub-block evaluation table is updated based on the I/O request. The sub-block evaluation process is performed by the data access control unit 45 with startup of the data storage server 22 as a trigger.

(S31) The data access control unit 45 judges whether or not an I/O request is received. When judged that an I/O request is received, the data access control unit 45 proceeds to S32. When judged that an I/O request is not received, the data access control unit 45 proceeds to S34.

(S32) The data access control unit 45 identifies a sub-block 53 that is an access subject of the received I/O request. The data access control unit 45 may identify the sub-block 53 in a manner similar to that at S15 to S17 of the data access control process.

(S33) The data access control unit 45 updates the update sub-block evaluation table by incrementing the number of accesses to the identified sub-block 53.

(S34) The data access control unit 45 judges whether or not an interchange timer times up. The interchange timer determines an interchange cycle for the update sub-block evaluation table and the reference sub-block evaluation table. When judged that the interchange timer times up, the data access control unit 45 proceeds to S35. When judged that the interchange timer does not time up, the data access control unit 45 proceeds to S31.

(S35) The data access control unit 45 interchanges the update sub-block evaluation table and the reference sub-block evaluation table. For example, the data access control unit 45 may switch the update sub-block evaluation table and the reference sub-block evaluation table by pointer switching.

(S36) The data access control unit 45 resets the update sub-block evaluation table (for example, clears the evaluation values to zero).

(S37) The data access control unit 45 resets the interchange timer and proceeds to S31.

Figure 12:
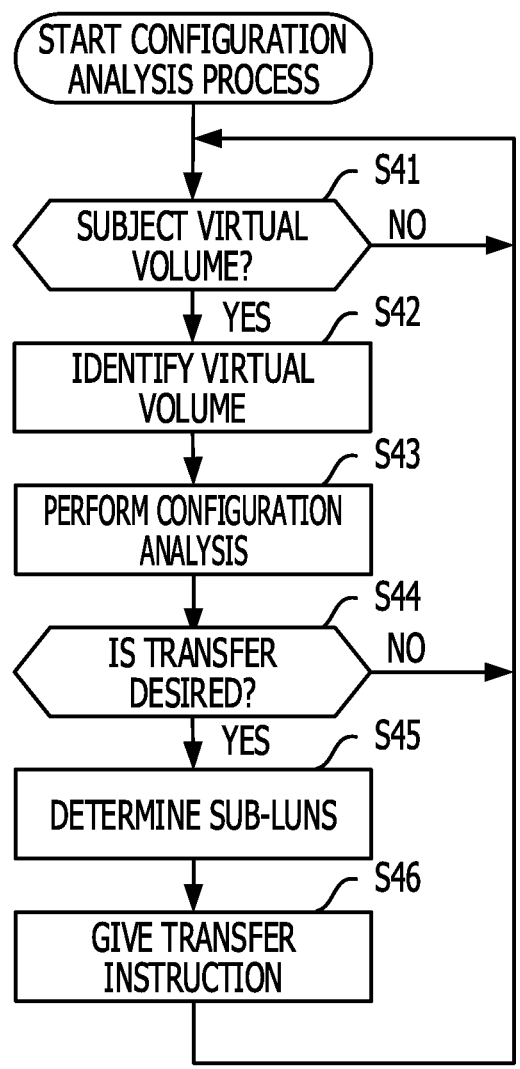
FIG. 12 is a flowchart of a configuration analysis process according to the second embodiment.

Next, a configuration analysis process according to the second embodiment will be described with reference to FIG. 12. FIG. 12 is a flowchart of the configuration analysis process according to the second embodiment.

In the configuration analysis process, regarding the SUB-LUNs 52 allocated to the virtual volume 50, the devices configuring the SUB-LUNs 52 are analyzed and notification of changes in configuration information is given to the data storage server 22. The configuration analysis process is performed by the configuration analyzing unit 40 with the startup of the data transfer instructing server 21 as a trigger.

(S41) The configuration analyzing unit 40 judges whether or not a virtual volume 50 to be analyzed is present. When judged that the virtual volume 50 to be analyzed is present, the configuration analyzing unit 40 proceeds to S42. When judged that the virtual volume 50 to be analyzed is not present, the configuration analyzing unit 40 waits.

(S42) The configuration analyzing unit 40 identifies the virtual volume 50 to be analyzed.

(S43) The configuration analyzing unit 40 performs configuration analysis of the identified virtual volume 50. The configuration analysis involves evaluating the validity of the devices configuring the SUB-LUNs 52 allocated to the virtual volume 50. In the evaluation of validity, arbitrary evaluation criteria may be applied for each virtual volume 50.

(S44) The configuration analyzing unit 40 judges whether or not to change the devices configuring the SUB-LUNs 52, in other words, whether or not to transfer a SUB-LUN 52. Transfer of a SUB-LUN 52 includes changing a SUB-LUN 52 allocated to the virtual volume 50, and transferring data from a SUB-LUN 52 of the transfer origin device to a SUB-LUN 52 of the transfer destination device. When judged that a SUB-LUN 52 is to be transferred, the configuration analyzing unit 40 proceeds to S45. When judged that the SUB-LUN 52 is not to be transferred, the configuration analyzing unit 40 proceeds to S41.

(S45) The configuration analyzing unit 40 determines the SUB-LUN 52 of the transfer origin device and the SUB-LUN 52 of the transfer destination device.

(S46) The configuration analyzing unit 40 gives a SUB-LUN transfer instruction to the data storage server 22 and proceeds to S41. The SUB-LUN transfer instruction includes information allowing identification of the SUB-LUN 52 of the transfer origin device and information allowing identification of the SUB-LUN 52 of the transfer destination device as pieces of constituent information.

Figure 13:
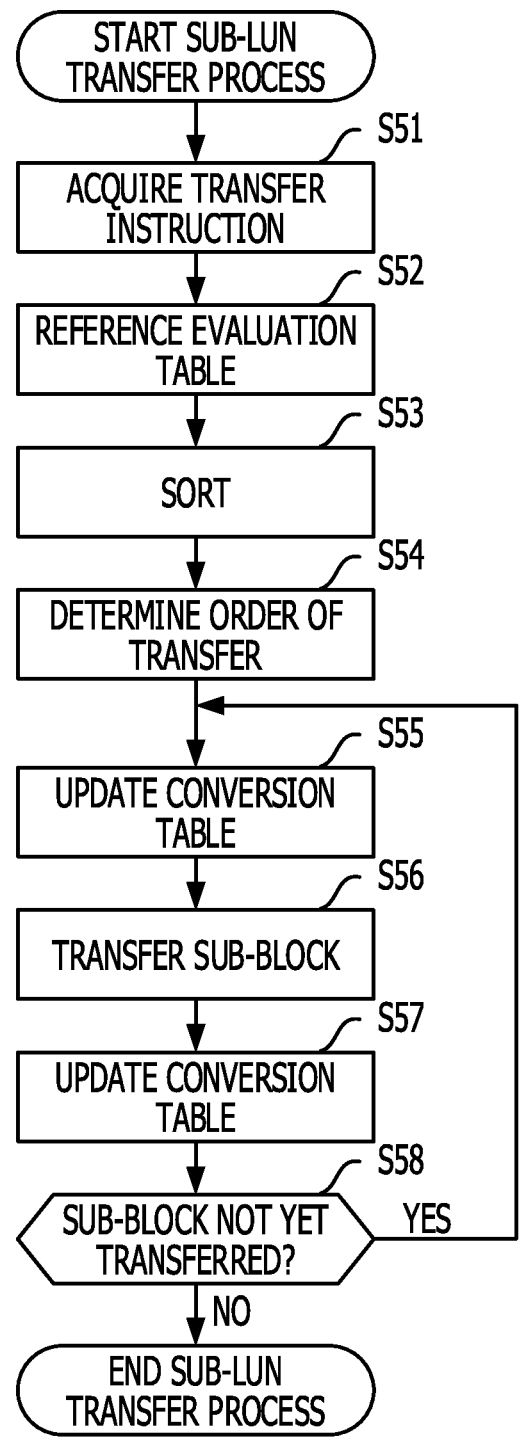
FIG. 13 is a flowchart of a SUB-LUN transfer process according to the second embodiment.

Next, a SUB-LUN transfer process according to the second embodiment will be described with reference to FIG. 13. FIG. 13 is a flowchart of the SUB-LUN transfer process according to the second embodiment.

In the SUB-LUN transfer process, data transfer of the SUB-LUN 52 is performed in sub-block 53 units in accordance with the SUB-LUN transfer instruction. The SUB-LUN transfer process is performed by the SUB-LUN transfer control unit 44 with reception of the SUB-LUN transfer instruction by the data storage server 22 as a trigger.

(S51) The SUB-LUN transfer control unit 44 acquires the SUB-LUN transfer instruction.

(S52) The SUB-LUN transfer control unit 44 acquires information allowing identification of the SUB-LUN 52 of the transfer origin device and information allowing identification of the SUB-LUN 52 of the transfer destination device from the pieces of constituent information included in the SUB-LUN transfer instruction. The SUB-LUN transfer control unit 44 references the conversion table 60 and identifies the sub-blocks 53 corresponding to the SUB-LUN 52 of the transfer origin device. The SUB-LUN transfer control unit 44 references the sub-block evaluation table 62 corresponding to the identified sub-blocks 53.

(S53) The SUB-LUN transfer control unit 44 sorts the sub-blocks 53 corresponding to the SUB-LUN 52 of the transfer origin device using the evaluation values in the sub-block evaluation table 62 as keys. For example, when performing a configuration change from a low speed device 33 to a high speed device 31, the SUB-LUN transfer control unit 44 arranges the sub-blocks 53 corresponding to the SUB-LUN 52 of the transfer origin device in the descending order of evaluation values. When performing a configuration change from a high speed device 31 to a low speed device 33, the SUB-LUN transfer control unit 44 arranges the sub-blocks 53 corresponding to the SUB-LUN 52 of the transfer origin device in ascending order of evaluation values.

(S54) The SUB-LUN transfer control unit 44 determines the sorted order to be the data transfer order of the sub-blocks 53.

(S55) The SUB-LUN transfer control unit 44 determines a head sub-block 53 among the sub-blocks 53 that are not yet transferred as a transfer subject sub-block 53 and updates the conversion table 60 to indicate that the transfer subject sub-block 53 is a data in-transfer sub-block.

(S56) The SUB-LUN transfer control unit 44 transfers the transfer subject sub-block 53. In other words, the SUB-LUN transfer control unit 44 copies data from a sub-block 53 of the SUB-LUN 52 of the transfer origin device to a sub-block 53 of the SUB-LUN 52 of the transfer destination device.

(S57) The SUB-LUN transfer control unit 44 updates the conversion table 60 to indicate that the transfer subject sub-block 53 is not a data in-transfer sub-block.

(S58) The SUB-LUN transfer control unit 44 judges whether or not a sub-block 53 that is not yet transferred is present. When judged that a sub-block 53 that is not yet transferred is present, the SUB-LUN transfer control unit 44 proceeds to S55. When judged that no sub-block 53 that is not yet transferred is present, the SUB-LUN transfer control unit 44 ends the SUB-LUN transfer process.

As a result, the storage system 20 may copy data from a sub-block 53 of the SUB-LUN 52 of the transfer origin device to a sub-block 53 of the SUB-LUN 52 of the transfer destination device in sub-block 53 units. The storage system 20 may enable the user to receive the benefits accompanying configuration change of the SUB-LUNs 52 without delay by prioritizing data transfer of a sub-block 53 having a high access state evaluation value. In addition, the storage system 20 does not have to excessively minimize the unit of the SUB-LUN 52. Therefore, load accompanying management and processing of the SUB-LUN 52 may be reduced. Therefore, the storage system 20 may effectively improve access performance in relation to load fluctuations.

The benefit received by the user is that user access may be performed to the high speed device 31 rather than the low speed device 33. When data is transferred from a low speed device 33 to a high speed device 31, it is expected that user access is efficiently performed to the high speed device 31 by preferentially transferring the sub-blocks 53 that have a high evaluation value.

On the other hand, when data is transferred from a high speed device 31 to a low speed device 33, it is expected that user access is efficiently performed to the high speed device 31 by delaying the transfer of the sub-blocks 53 that have a high evaluation value.

At S52, when performing the configuration change from a low speed device 33 to a high speed device 31, the SUB-LUN transfer control unit 44 may arrange the sub-blocks 53 corresponding to the SUB-LUN 52 of the transfer origin device in the forward direction in the SUB-LUN 52, with the sub-block 53 having the highest evaluation value at the head. In this instance, the last sub-block 53 of the SUB-LUN 52 is followed by the head sub-block 53 of the SUB-LUN 52. When performing the configuration change from a high speed device 31 to a low speed device 33, the SUB-LUN transfer control unit 44 may arrange the sub-blocks 53 corresponding to the SUB-LUN 52 of the transfer origin device in the forward direction in the SUB-LUN 52, with the sub-block 53 having the lowest evaluation value at the head. In this instance, the last sub-block 53 of the SUB-LUN 52 is followed by the head sub-block 53 of the SUB-LUN 52.

In the SUB-LUN transfer process, the conversion table 60 is updated as illustrated in FIG. 14. FIG. 14 is a diagram illustrating an example of a conversion table according to the second embodiment. A conversion table 60a indicates the transfer process of the SUB-LUN 52 from a low speed device 33a of the SUB-LUN 51 ("SUB-LUN#1") of the virtual volume 50 illustrated in FIG. 8 to a high speed device 31a.

The conversion table 60a has "SUB-LUN#1", "SUB-LUN#1", "SUB-LUN#2", "SUB-LUN#3", and "SUB-LUN#4" as "virtual volume SUB-LUN". Because "SUB-LUN#1" is the transfer subject, and a transfer origin SUB-LUN and a transfer destination SUB-LUN are provided, there are two "SUB-LUN#1".

The transfer origin SUB-LUN is the SUB-LUN "SL#1" of the disk ID "HDD#2". The transfer destination SUB-LUN is the SUB-LUN "SL#1" of the disk ID "SSD#1".

The sub-block IDs of the transfer origin SUB-LUN are "SB#1", "SB#3", and "SB#4". Two sub-blocks 53, excluding the sub-block 53 ("SB#3") that is in the midst of data transfer, may be accessed. Data readout of the sub-block 53 ("SB#3") that is in the midst of data transfer may be permitted. The sub-block ID of the transfer destination SUB-LUN is "SB#2". This single sub-block 53 is allowed to be accessed. When data transfer of "SB#3" is completed, the sub-block IDs of the transfer origin SUB-LUN become "SB#1" and "SB#4", and the sub-block IDs of the transfer destination SUB-LUN become "SB#2" and "SB#3".

When data transfer of all sub-blocks 53 is completed, the transfer origin SUB-LUN is released from allocation to the virtual volume 50. Therefore, the SUB-LUN "SL#1" of the disk ID "HDD#2" is deleted from the conversion table 60a as the transfer origin SUB-LUN, after the completion of data transfer of all sub-blocks 53.

Figure 15:
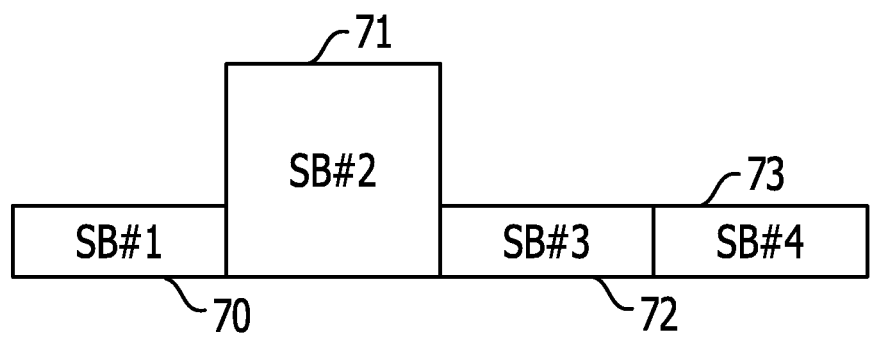
FIG. 15 is a diagram illustrating an example of an evaluation value of access state for each sub-block according to the second embodiment.

Next, evaluation of access state according to the second embodiment will be described with reference to FIG. 15 to FIG. 18. FIG. 15 is a diagram illustrating an example of an evaluation value of access state for each sub-block according to the second embodiment.

An evaluation value 70 is an evaluation value of the sub-block 53 ("SB#1"). For example, if the evaluation value 70 is the evaluation value of the sub-block 53 ("SB#1") of the "SUB-LUN#1" of the virtual volume 50 in the sub-block evaluation table 62, the evaluation value 70 is "10". In a similar manner, an evaluation value 71 is an evaluation value "30" of the sub-block 53 ("SB#2"), an evaluation value 72 is an evaluation value "10" of the sub-block 53 ("SB#3"), and an evaluation value 73 is an evaluation value "10" of the sub-block 53 ("SB#4"). The size of the outer shape of the evaluation value corresponds to the magnitude of the evaluation value.

Figure 16:
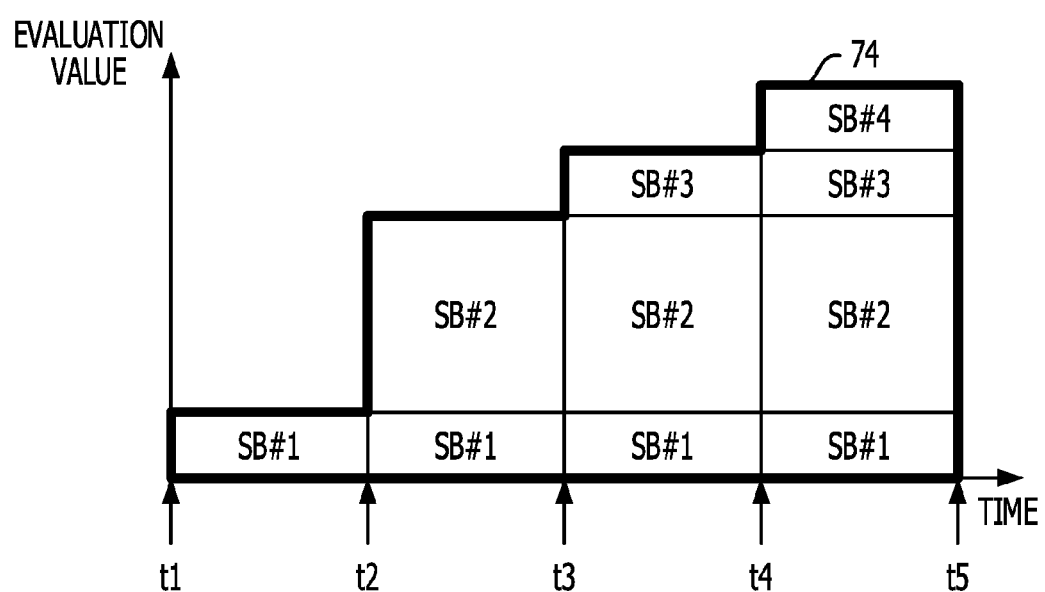
FIG. 16 is a diagram illustrating an example of accumulation of evaluation values of access state according to the second embodiment.

For example, if data transfer is performed in order from the head, as in the past, on the premise of the evaluation values, the data transfer is as illustrated in FIG. 16. FIG. 16 is a diagram illustrating an example of accumulation of evaluation values of access state according to the second embodiment.

Data transfer of the sub-block 53 ("SB#1") is started at timing t1 and completed by timing t2. Data transfer of the sub-block 53 ("SB#2") is started at timing t2 and completed by timing t3. Data transfer of the sub-block 53 ("SB#3") is started at timing t3 and completed by timing t4. Data transfer of the sub-block 53 ("SB#4") is started at timing t4 and completed by timing t5.

In an instance such as that described above, it may be considered that the user obtains an accumulated evaluation value 74 equivalent to the size indicated by the thick frame, from timing t1 to timing t5. The accumulated evaluation value 74 becomes "160 (=(10)+(10+30)+(10+30+10)+(10+30+10))" at a rough estimate.

Figure 17:
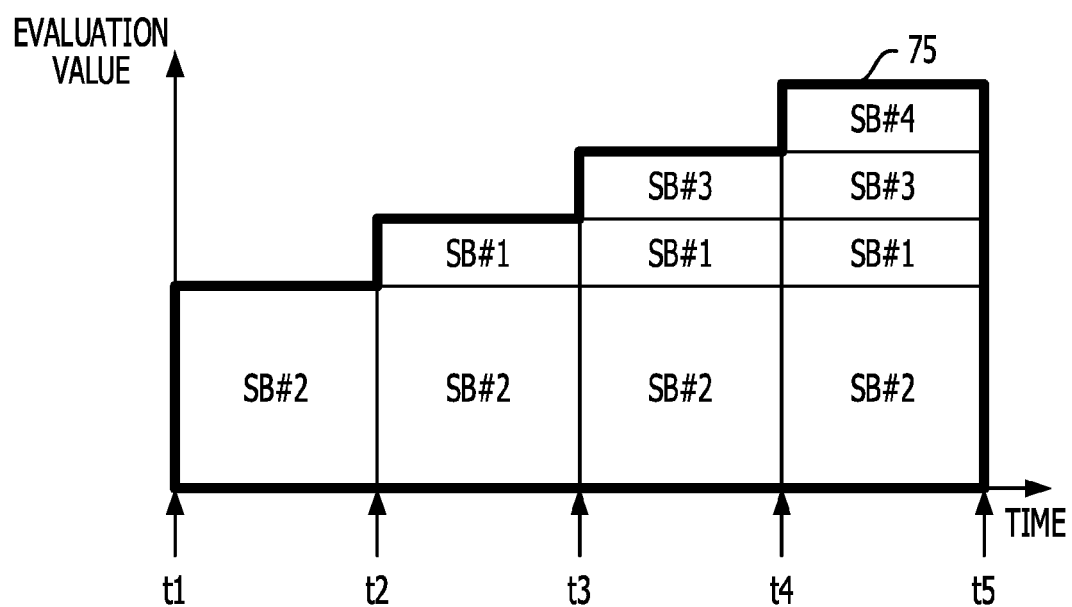
FIG. 17 is a diagram illustrating an example of accumulation of evaluation values of access state according to the second embodiment.
Figure 18:
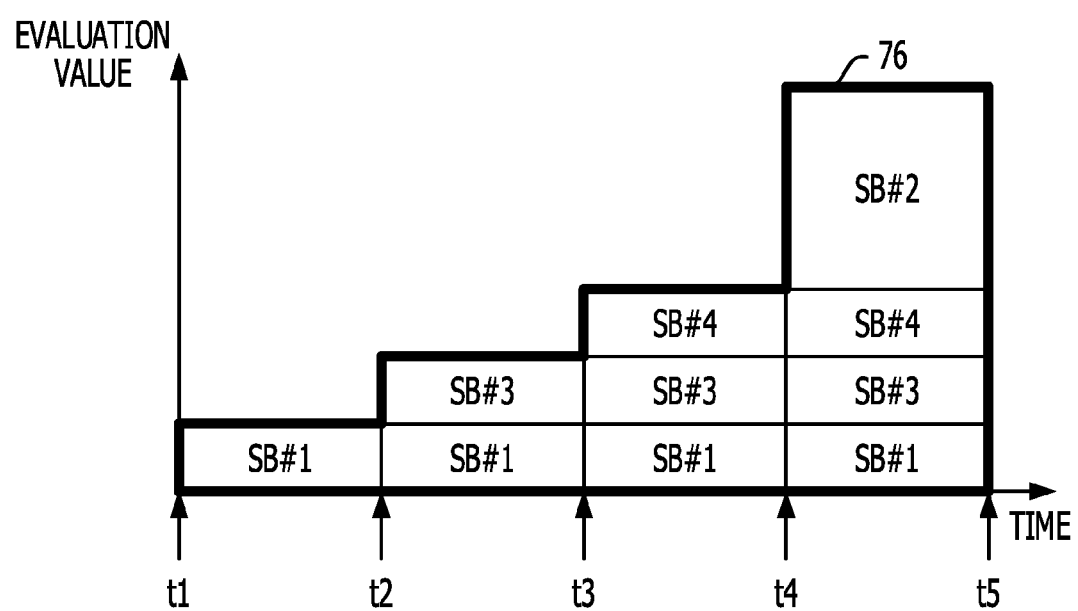
FIG. 18 is a diagram illustrating an example of accumulation of evaluation values of access state according to the second embodiment.

When the data transfer order of the data is rearranged in sub-block 53 units, the accumulated evaluation value of access state is as illustrated in FIGS. 17 and 18. First, the accumulated evaluation value of access state when the configuration conversion is performed from a low speed device 33 to a high speed device 31 is illustrated in FIG. 17. FIG. 17 is a diagram illustrating an example of accumulation of evaluation values of access state according to the second embodiment.

The SUB-LUN transfer control unit 44 sets the data transfer order in sub-block 53 units in descending order of evaluation value. Data transfer of the sub-block 53 ("SB#2") is started at timing t1 and completed by timing t2. Data transfer of the sub-block 53 ("SB#1") is started at timing t2 and completed by timing t3. Data transfer of the sub-block 53 ("SB#3") is started at timing t3 and completed by timing t4. Data transfer of the sub-block 53 ("SB#4") is started at timing t4 and completed by timing t5.

In an instance such as that described above, it may be considered that the user obtains an accumulated evaluation value 75 equivalent to the size indicated by the thick frame, from timing t1 to timing t5. The accumulated evaluation value 75 becomes "180 (=(30)+(30+10)+(30+10+10)+(30+10+10+10))" at a rough estimate.

Therefore, the accumulated evaluation value 75 is greater than the accumulated evaluation value 74, and the user receives greater benefits than in the past.

Next, the accumulated evaluation value of access state when the configuration conversion is performed from a high speed device 31 to a low speed device 33 is illustrated in FIG. 18. FIG. 18 is a diagram illustrating an example of accumulation of evaluation values of access state according to the second embodiment.

When performing a configuration change from a high speed device 31 to a low speed device 33, the SUB-LUN transfer control unit 44 sets the data transfer order in sub-block 53 units in ascending order of evaluation value. Data transfer of the sub-block 53 ("SB#1") is started at timing t1 and completed by timing t2. Data transfer of the sub-block 53 ("SB#3") is started at timing t2 and completed by timing t3. Data transfer of the sub-block 53 ("SB#4") is started at timing t3 and completed by timing t4. Data transfer of the sub-block 53 ("SB#2") is started at timing t4 and completed by timing t5.

In an instance such as that described above, it may be considered that the user obtains an accumulated evaluation value 76 equivalent to the size indicated by the thick frame, from timing t1 to timing t5. The accumulated evaluation value 76 becomes "120 (=(10)+(10+10)+(10+10+10)+(10+10+10+30))" at a rough estimate.

When the configuration is changed from a high speed device 31 to a low speed device 33, a fast configuration change is disadvantageous to the user and is preferably minimized. Therefore, the accumulated evaluation value 76 is less than the accumulated evaluation value 74, and the user receives greater benefits than in the past.

The evaluation values may be considered benefits (advantages) to the user when data transfer is performed from a low speed device 33 to a high speed device 31. In addition, the evaluation values may be considered inverse benefits (loss) to the user when data transfer is performed from a high speed device 31 to a low speed device 33.

Figure 19:
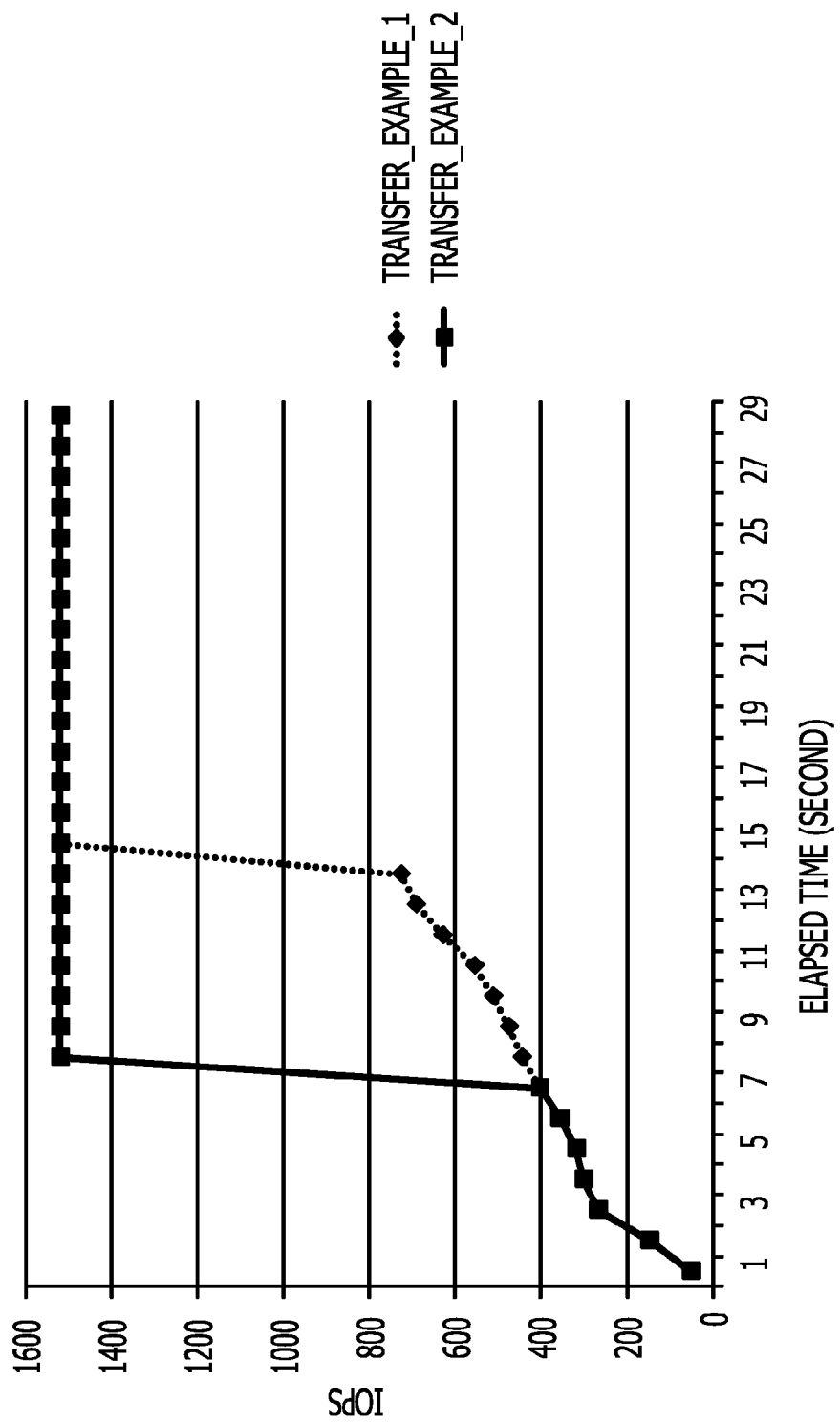
FIG. 19 is a diagram illustrating an example of simulations of the number of I/O request processes according to the second embodiment.

Next, an example of simulations of the configuration change from a low speed device 33 to a high speed device 31 is illustrated in FIG. 19. FIG. 19 is a diagram illustrating an example of simulations of the number of I/O request processes according to the second embodiment.

The graph illustrated in FIG. 19 indicates simulation examples of an instance in which the SUB-LUN 51 configured by eight 128 MB sub-blocks 53 is moved from a low speed device 33 to a high speed device 31. The horizontal axis indicates the elapsed time, and the vertical axis indicates the number (IOPS) of I/O per second that serves as unit time. Transfer_example_1 illustrated by the dotted line indicates an instance in which data transfer is performed from the head sub-block 53. Transfer_example_2 illustrated by the solid line indicates an instance in which data transfer is performed when the data transfer order of the sub-blocks 53 is the descending order of evaluation value. The IOPS for each sub-block 53 is used for evaluation of the sub-block 53. In the example illustrated in FIG. 19, only one of the eight sub-blocks 53 has a high evaluation value.

Here, the transfer of 128 MB of data takes one second. The high speed device 31 has a processing capacity of 2000 IOPS. In addition, the data storage server 22 receives the data transfer instruction for the SUB-LUN 51 at the six-second point.

In the simulation example, in transfer_example_2, the high evaluation sub-block 53 is quickly transferred from a low speed device 33 to a high speed device 31 after the data transfer instruction. As a result, it is clear that the access speed is higher in the transfer_example_2 than in the transfer_example_1.

Figure 20:
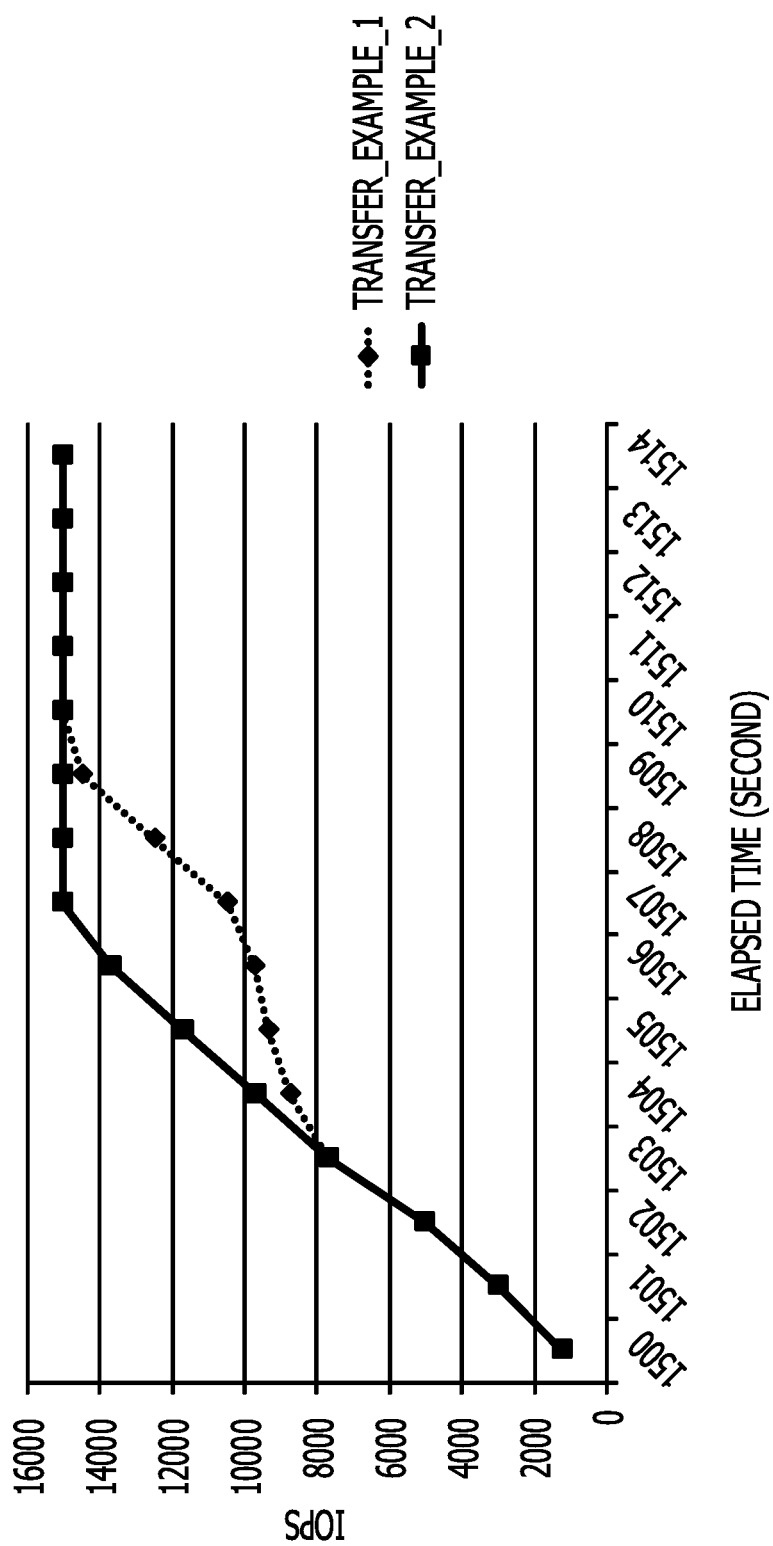
FIG. 20 is a diagram illustrating an example of simulations of the number of I/O request processes according to the second embodiment.

Furthermore, an example of simulations of the configuration change from a low speed device 33 to a high speed device 31 is illustrated in FIG. 20. FIG. 20 is a diagram illustrating an example of simulations of number of I/O request processes according to the second embodiment. In the example illustrated in FIG. 20, several sub-blocks 53 of the eight sub-blocks 53 have high evaluation values.

The data storage server 22 receives the data transfer instruction for the SUB-LUN 51 at the 1500-second point. In the simulation example, in transfer_example_2, the high evaluation sub-blocks 53 are quickly transferred from a low speed device 33 to a high speed device 31 after the data transfer instruction. As a result, it is clear that the access speed is higher in the transfer_example_2 than in the transfer_example_1.

As described above, the storage system 20 may efficiently improve access performance in relation to load fluctuations.

Third Embodiment

Figure 21:
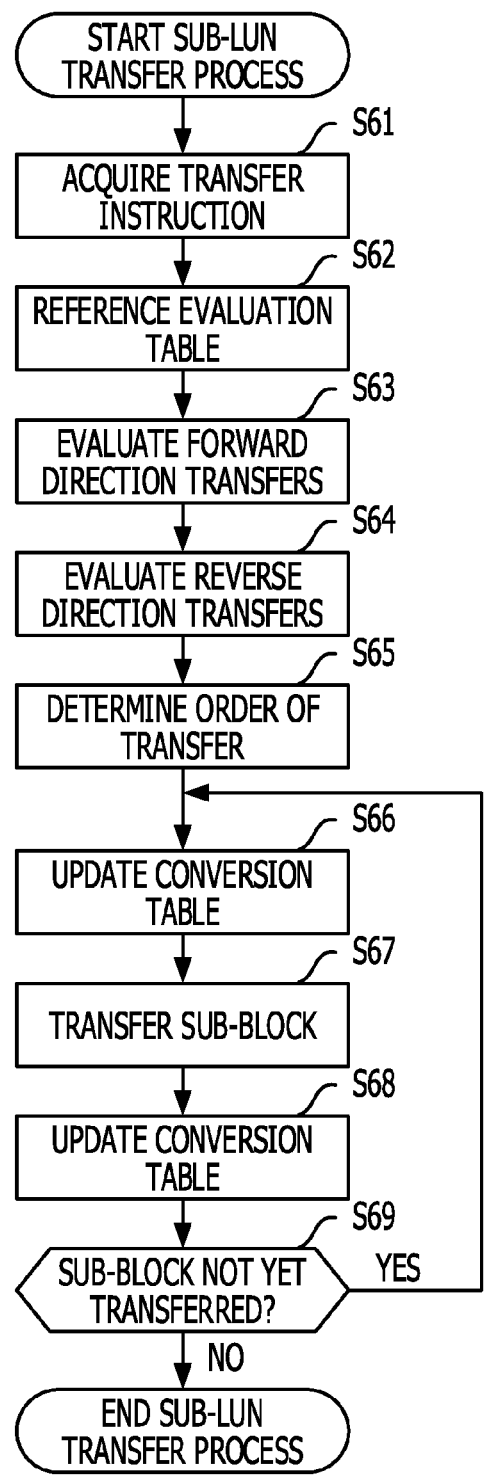
FIG. 21 is a flowchart of a SUB-LUN transfer process according to a third embodiment.

Next, a SUB-LUN transfer process according to a third embodiment will be described with reference to FIG. 21. FIG. 21 is a flowchart of the SUB-LUN transfer process according to the third embodiment.

In the SUB-LUN transfer process, data transfer of SUB-LUN 52 is performed in sub-block 53 units in accordance with the SUB-LUN transfer instruction. The SUB-LUN transfer process is performed by the SUB-LUN transfer control unit 44 with reception of the SUB-LUN transfer instruction by the data storage server 22 as a trigger.

(S61) The SUB-LUN transfer control unit 44 acquires the SUB-LUN transfer instruction.

(S62) The SUB-LUN transfer control unit 44 acquires information allowing identification of the SUB-LUN 52 of the transfer origin device and information allowing identification of the SUB-LUN 52 of the transfer destination device from the pieces of constituent information included in the SUB-LUN transfer instruction. The SUB-LUN transfer control unit 44 references the conversion table 60 and identifies the sub-blocks 53 corresponding to the SUB-LUN 52 of the transfer origin device. The SUB-LUN transfer control unit 44 references the sub-block evaluation table 62 corresponding to the identified sub-blocks 53.

(S63) The SUB-LUN transfer control unit 44 evaluates forward direction transfers of the sub-blocks 53 based on the evaluation values in the sub-block evaluation table 62. The forward direction transfers of the sub-blocks 53 are data transfers in the order of the forward direction (ascending order) of the sub-blocks 53 with one of the sub-blocks 53 as a starting point. The number of transfer patterns corresponds to the number of sub-blocks 53. For example, if there are four sub-blocks 53 ("SB#1", "SB#2", "SB#3", and "SB#4"), there are the following four transfer patterns.

Forward direction pattern_1: "SB#1"→"SB#2"→"SB#3"→"SB#4"

Forward direction pattern_2: "SB#2"→"SB#3"→"SB#4"→"SB#1"

Forward direction pattern_3: "SB#3"→"SB#4"→"SB#1"→"SB#2"

Forward direction pattern_4: "SB#4"→"SB#1"→"SB#2"→"SB#3"

For example, according to the evaluation values of the sub-blocks 53 of the SUB-LUN 51 ("SUB-LUN#3") of the virtual volume 50, the respective evaluation values of the sub-blocks 53 are, "10", "40", "20", and "10", in the order of "SB#1", "SB#2", "SB#3", and "SB#4". At this time, the respective evaluation values of the transfer patterns are as follows.

Evaluation value of forward direction pattern_1: "210 (=10+(10+40)+(10+40+20)+(10+40+20+10))"

Evaluation value of forward direction pattern_2: "250 (=40+(40+20)+(40+20+10)+(40+20+10+10))"

Evaluation value of forward direction pattern_3: "170 (=20+(20+10)+(20+10+10)+(20+10+10+40))"

Evaluation value of forward direction pattern_4: "170 (=10+(10+10)+(10+10+40)+(10+10+40+20))"

(S64) The SUB-LUN transfer control unit 44 evaluates reverse direction transfers of the sub-blocks 53 based on the evaluation values in the sub-block evaluation table 62. The reverse direction transfers of the sub-blocks 53 are data transfers in the order of the reverse direction (descending order) of the sub-blocks 53 with one of the sub-blocks 53 as a starting point. The number of transfer patterns corresponds to the number of sub-blocks 53. For example, if there are four sub-blocks 53 ("SB#1", "SB#2", "SB#3", and "SB#4"), there are the following four transfer patterns.

Reverse direction pattern_1: "SB#4" "SB#3" "SB#2" "SB#1"

Reverse direction pattern_2: "SB#3" "SB#2" "SB#1" "SB#4"

Reverse direction pattern_3: "SB#2" "SB#1" "SB#4" "SB#3"

Reverse direction pattern_4: "SB#1" "SB#4" "SB#3" "SB#2"

For example, according to the evaluation values of the sub-blocks 53 of the SUB-LUN 51 ("SUB-LUN#3") of the virtual volume 50, the respective evaluation values of the sub-blocks 53 are, "10", "40", "20", and "10", in the order of "SB#1", "SB#2", "SB#3", and "SB#4". At this time, the respective evaluation values of the transfer patterns are as follows.

Evaluation value of reverse direction pattern_1: "190 (=10+(10+20)+(10+20+40)+(10+20+40+10))"

Evaluation value of reverse direction pattern_2: "230 (=20+(20+40)+(20+40+10)+(20+40+10+10))"

Evaluation value of reverse direction pattern_3: "230 (=40+(40+10)+(40+10+10)+(40+10+10+20))"

Evaluation value of reverse direction pattern_4: "150 (=10+(10+10)+(10+10+20)+(10+10+20+40))"

(S65) When performing the configuration change from a low speed device 33 to a high speed device 31, the SUB-LUN transfer control unit 44 compares the maximum evaluation value of the forward direction transfer patterns with the maximum evaluation value of the reverse direction transfer patterns. The SUB-LUN transfer control unit 44 determines a transfer pattern with the higher of the maximum evaluation value of the forward direction transfer patterns and the maximum evaluation value of the reverse direction transfer patterns as the data transfer order of the sub-blocks 53. For example, from the maximum evaluation value (evaluation value of forward direction pattern_2: "250") of the forward direction transfer patterns and the maximum evaluation value (evaluation of reverse direction pattern_2: "230") of the reverse direction transfer patterns, the SUB-LUN transfer control unit 44 determines the forward direction pattern_2 to be the data transfer order of the sub-blocks 53.

When performing the configuration change from a high speed device 31 to a low speed device 33, the SUB-LUN transfer control unit 44 compares the minimum evaluation value of the forward direction transfer patterns with the minimum evaluation value of the reverse direction transfer patterns, and determines a transfer pattern with the lower evaluation value to be the data transfer order of the sub-blocks 53.

(S66) The SUB-LUN transfer control unit 44 determines a head sub-block 53 among the sub-blocks 53 that are not yet transferred as a transfer subject sub-block 53 and updates the conversion table 60 to indicate that the transfer subject sub-block 53 is a data in-transfer sub-block.

(S67) The SUB-LUN transfer control unit 44 transfers the transfer subject sub-block 53. In other words, the SUB-LUN transfer control unit 44 copies data from a sub-block 53 of the SUB-LUN 52 of the transfer origin device to a sub-block 53 of the SUB-LUN 52 of the transfer destination device.

(S68) The SUB-LUN transfer control unit 44 updates the conversion table 60 to indicate that the transfer subject sub-block 53 is not a data in-transfer sub-block.

(S69) The SUB-LUN transfer control unit 44 judges whether or not a sub-block 53 that is not yet transferred is present. When judged that a sub-block 53 that is not yet transferred is present, the SUB-LUN transfer control unit 44 proceeds to S66. When judged that no sub-block 53 that is not yet transferred is present, the SUB-LUN transfer control unit 44 ends the SUB-LUN transfer process.

The SUB-LUN transfer control unit 44 such as that described above may determine the transfer pattern without excessively increasing processing load. As a result, the storage system 20 may copy data from a sub-block 53 of the SUB-LUN 52 of the transfer origin device to a sub-block 53 of the SUB-LUN 52 of the transfer destination device in sub-block 53 units. By preferentially performing data transfer of the sub-block 53 having a high evaluation value of access state, the storage system 20 enables the user to receive benefits accompanying the configuration change of the SUB-LUN without delay. In addition, because the unit of the SUB-LUN 52 does not have to be made excessively small, the storage system 20 may reduce load accompanying management and processing of the SUB-LUN 52. Therefore, the storage system 20 may efficiently improve access performance in relation to load fluctuations.

Figure 22:
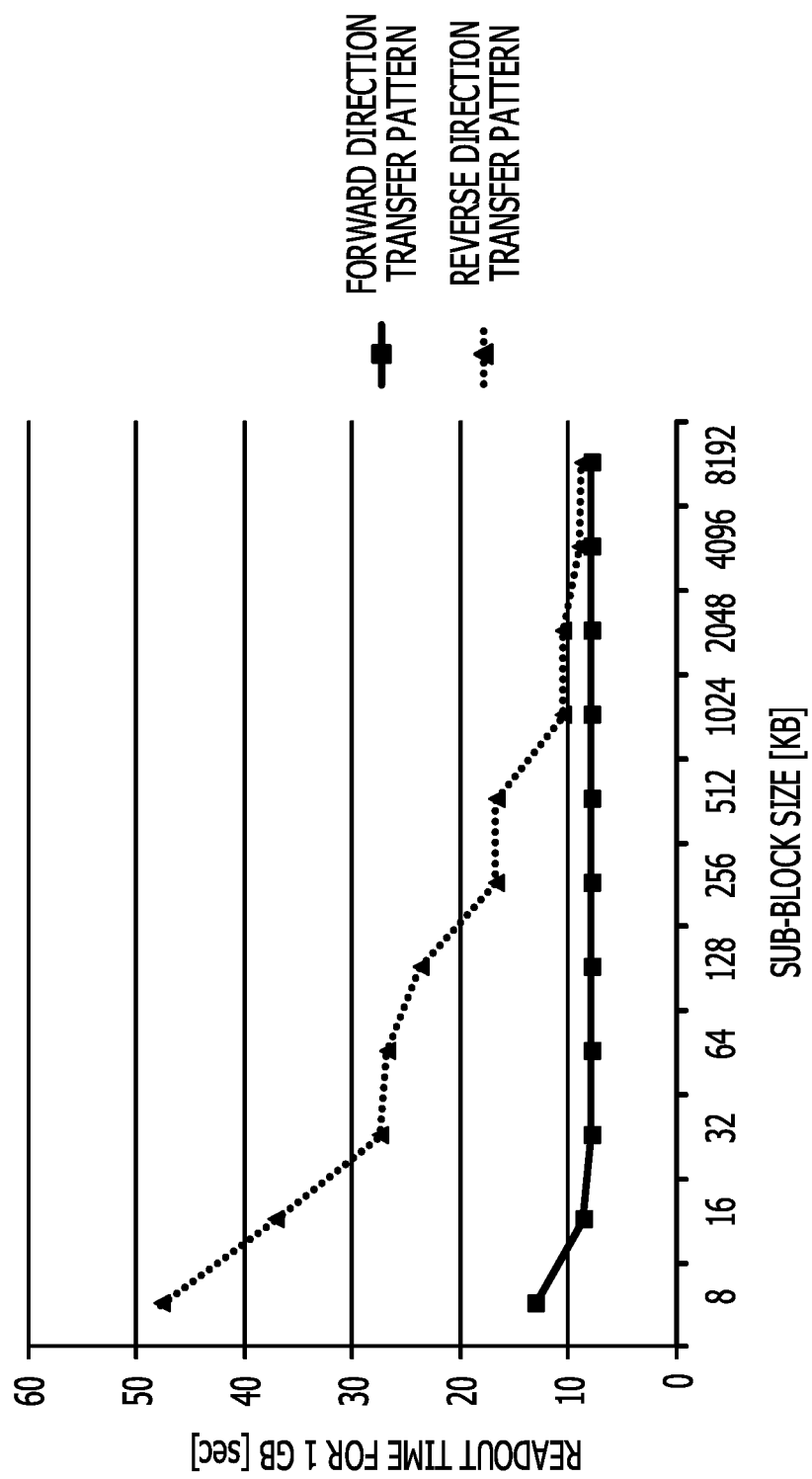
FIG. 22 is a diagram illustrating an example of simulations of readout time according to the third embodiment.

Next, an example of simulations of the configuration change from a low speed device 33 to a high speed device 31 is illustrated in FIG. 22. FIG. 22 is a diagram illustrating an example of simulations of readout time according to the third embodiment.

The graph illustrated in FIG. 22 indicates simulation examples of the readout times for 1 GB of data when the forward direction transfer pattern and the reverse direction transfer pattern are applied to different sizes of the sub-blocks 53. The horizontal axis indicates the size [KB] of the sub-block 53, and the vertical axis indicates the amount of time [sec] to read 1 GB of data. The solid line indicates the forward direction transfer pattern. The dotted line indicates the reverse direction transfer pattern.

In the forward direction transfer pattern, difference in performance attributed to difference in the size of the sub-blocks 53 is small. In the reverse direction transfer pattern, difference in performance attributed to difference in the size of the sub-blocks 53 is large. The difference between performances in the forward direction transfer pattern and the reverse direction transfer pattern tends to decrease as the size of the sub-block 53 increases, significantly decreases near 1024 KB, and becomes almost equal from near 4096 KB.

Therefore, when the size of the sub-block 53 is smaller than a predetermined value, the SUB-LUN transfer control unit 44 may not select the reverse direction transfer pattern. Alternatively, the SUB-LUN transfer control unit 44 may correct the evaluation value of the reverse direction transfer pattern or the forward direction transfer pattern depending on the size of the sub-block 53.

In the storage system 1 according to the first embodiment and the storage system 20 according to the second embodiment, storage devices of two levels in access speed are given as an example. However, storage devices of three or more levels in access speed may be included. For example, a nearline disk composed of HDDs may be used as a storage device having a low access speed. An online disk composed of HDDs may be used as a slightly faster storage device. An online disk composed of SSDs may be used as the fastest storage device.

The above-described processing functions may be actualized by a computer. In this instance, a program is provided that contains the processing details of functions to be provided by the data storage server 22, the data transfer instructing server 21, and the information processing device 10. As a result of the program being executed by a computer, the processing functions are actualized on the computer. The program in which the processing contents are written may be recorded in a computer-readable recording medium. The computer-readable recording medium may be a magnetic storage device, an optical disk, a magneto-optical recording medium, a semiconductor memory, or the like. The magnetic storage device may be a hard disk device (HDD), a flexible disk (FD), a magnetic tape, or the like. The optical disk may be a DVD, a DVD-RAM, a CD-ROM/RW, or the like. The magneto-optical recording medium may be a magneto-optical disk (MO).

If the program is to be circulated, for example, a portable recording medium, such as a DVD or a CD-ROM, in which the program is recorded is sold. Alternatively, the program may be stored in a storage device of a server computer, and transferred to another computer from the server computer over a network.

The computer that executes the program stores the program recorded on a portable recording medium or the program transferred from a server computer into a storage device of the computer. The computer then reads out the program from the storage device and performs the process in accordance with the program. The computer may read out the program directly from the portable recording medium and perform the process in accordance with the program. The computer may successively perform the process in accordance with the program every time the program is transferred from a connected server computer over the network.

At least some of the above-described processing functions may be actualized by an electronic circuit, such as a DSP, an ASIC, or a PLD.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A storage system comprising:
a first storage device;
a second storage device having an access speed higher than an access speed of the first storage device; and
an information processing device to allocate storage capacity to a virtual volume from the first storage device and the second storage device, the information processing device including:
at least one processor configured to
allocate a plurality of allocation unit areas to the virtual volume from the first storage device and the second storage device,
determine an access frequency for each of a plurality of divided areas into which each of the plurality of allocation unit areas is divided,
determine changes in the access frequencies,
generate evaluation information based on the determined changes of the access frequencies,
when the access frequency of a first allocation unit area of the first storage device increases over a threshold, change an allocation origin of the first allocation unit area from the first storage device to a second allocation unit area of the second storage device,
determine based on the generated evaluation information, when the allocation origin of the first allocation unit area changes from the first storage device to the second storage device, a first data transfer order of transferring data in divided area units from the first allocation unit area to the second allocation unit area, and
transfer the data in accordance with the first data transfer order.

2. The storage system according to claim 1, wherein the at least one processor is further configured to
determine the first data transfer order such that a divided area having a highest evaluation value is set at a head of the first data transfer order.

3. The storage system according to claim 2, wherein the at least one processor is further configured to
determine the first data transfer order such that the plurality of divided areas are arranged in descending order of evaluation values of the plurality of divided areas.

4. The storage system according to claim 2, wherein the at least one processor is further configured to determine the first data transfer order such that the plurality of divided areas are arranged in forward direction with the divided area having the highest evaluation value set at the head of the first data transfer order.

5. The storage system according to claim 1, wherein the at least one processor is further configured to calculate an accumulated evaluation value for each of a plurality of first transfer orders, the plurality of divided areas being arranged in a forward direction in the first transfer orders, divided areas set at heads of the first transfer orders being different from one another, and determine the first data transfer order having a first accumulated evaluation value highest among the accumulated evaluation values calculated for the first transfer orders.

6. The storage system according to claim 1, wherein the at least one processor is further configured to calculate an accumulated evaluation value for each of a plurality of first transfer orders and each of a plurality of second transfer orders, the plurality of divided areas being arranged in a forward direction in the first transfer orders, the plurality of divided areas being arranged in a reverse direction in the second transfer orders, divided areas set at heads of the first transfer orders being different from one another, divided areas set at heads of the second transfer orders being different from one another, and determine the first data transfer order having a first accumulated evaluation value highest among the accumulated evaluation values calculated for the first transfer orders and the second transfer orders.

7. The storage system according to claim 6, wherein the at least one processor is further configured to determine, when a unit size of each of the plurality of divided areas is greater than a predetermined size, the first data transfer order having the first accumulated evaluation value, and determine, when the unit size is not greater than the predetermined size, the first data transfer order having a second accumulated evaluation value highest among the accumulated evaluation values calculated for the first transfer orders.

8. The storage system according to claim 1, wherein the at least one processor is further configured to determine based on the evaluation information, when allocation to the virtual volume is changed from the second allocation unit area to the first allocation unit area, a second data transfer order such that a divided area having a lowest evaluation value is set at a head of the second data transfer order.

9. A non-transitory computer-readable recording medium having stored therein a program for causing a computer to execute a process, the computer allocating storage capacity to a virtual volume from a first storage device and a second storage device having an access speed higher than an access speed of the first storage device, the process comprising:

allocating a plurality of allocation unit areas to the virtual volume from the first storage device and the second storage device;

determining an access frequency for each of a plurality of divided areas into which each of the plurality of allocation unit areas is divided; determining changes in the access frequencies;

generating evaluation information based on the determined changes of the access frequencies;

when the access frequency of a first allocation unit area of the first storage device increases over a threshold, changing an allocation origin of the first allocation unit area from the first storage device to a second allocation unit area of the second storage device;

determining based on the generated evaluation information, when the allocation origin of the first allocation unit area changes from the first storage device to the second storage device, a first data transfer order of transferring data in divided area units from the first allocation unit area to the second allocation unit area; and transferring the data in accordance with the first data transfer order.

10. A method for controlling a storage system including a first storage device, a second storage device, and an information processing device, the second storage device having an access speed higher than an access speed of the first storage device, the information processing device allocating storage capacity to a virtual volume from the first storage device and the second storage device, the method comprising:

allocating, by the information processing device, a plurality of allocation unit areas to the virtual volume from the first storage device and the second storage device;

determining an access frequency for each of a plurality of divided areas into which each of the plurality of allocation unit areas is divided;

determining changes in the access frequencies;

generating evaluation information based on the determined changes of the access frequencies;

when the access frequency of a first allocation unit area of the first storage device increases over a threshold, changing an allocation origin of the first allocation unit area from the first storage device to a second allocation unit area of the second storage device;

determining based on the generated evaluation information, when the allocation origin of the first allocation unit area changes from the first storage device to the second storage device, an first data transfer order of transferring data in divided area units from the first allocation unit area to the second allocation unit area; and transferring the data in accordance with the first data transfer order.

* * * * *